US012668320B2

(12) United States Patent　　　　(10) Patent No.: US 12,668,320 B2
Koizumi et al.　　　　　　　　　　　　(45) Date of Patent: Jun. 30, 2026

(54) CRAWLER TYPE TRAVELING BODY AND TRAVELING APPARATUS

(71) Applicants:Eichi Koizumi, Kanagawa (JP);
　　　　　　　Hiroshi Shimura, Kanagawa (JP);
　　　　　　　Ryota Yamashina, Kanagawa (JP);
　　　　　　　Taku Kitahara, Tokyo (JP); Hiroshi Okamoto, Kanagawa (JP)

(72) Inventors: Eichi Koizumi, Kanagawa (JP);
　　　　　　　Hiroshi Shimura, Kanagawa (JP);
　　　　　　　Ryota Yamashina, Kanagawa (JP);
　　　　　　　Taku Kitahara, Tokyo (JP); Hiroshi Okamoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 347 days.

(21) Appl. No.: 18/420,012

(22) Filed: Jan. 23, 2024

(65) Prior Publication Data

US 2024/0199147 A1　　　Jun. 20, 2024

Related U.S. Application Data

(62) Division of application No. 17/156,917, filed on Jan. 25, 2021, now Pat. No. 11,964,710.

(30) Foreign Application Priority Data

Jan. 27, 2020　(JP) ................................. 2020-010791
Jan. 20, 2021　(JP) ................................. 2021-007455

(51) Int. Cl.
　　B62D 55/30　　　　(2006.01)
　　B62D 55/12　　　　(2006.01)

(52) U.S. Cl.
　　CPC ............. B62D 55/30 (2013.01); B62D 55/12 (2013.01)

(58) Field of Classification Search
　　CPC ...................................................... B62D 55/30
　　See application file for complete search history.

(56) References Cited

U.S. PATENT DOCUMENTS 3,608,661 A　　9/1971　Arnot
3,736,032 A　　5/1973　Mosshart et al.
　　　　　　　(Continued)

FOREIGN PATENT DOCUMENTS

CN　　　106741114 A　　5/2017
CN　　　206171538 U　　5/2017
　　　　　(Continued)

OTHER PUBLICATIONS

Extended European Search Report dated Jun. 28, 2021 issued in corresponding European Appln. No. 21153412.8.
　　　　　(Continued)

*Primary Examiner* — Kevin Hurley
(74) *Attorney, Agent, or Firm* — Harness, Dickey & Pierce, P.L.C.

(57)　　　　　ABSTRACT

A crawler type traveling body includes a drive wheel, an in-wheel motor incorporated in the drive wheel, a plurality of rotating wheels disposed below the drive wheel, a crawler, and a tensioner. The crawler is wound around the drive wheel and the rotating wheels and configured to be rotated by the drive wheel. The tensioner is coupled to a drive shaft of the in-wheel motor and configured to press the drive wheel against the crawler and apply tension to the crawler.

17 Claims, 23 Drawing Sheets

(56) References Cited

U.S. PATENT DOCUMENTS

| | | | |
|---|---|---|---|
| 3,841,424 | A | 10/1974 | Purcell et al. |
| 8,240,783 | B2 | 8/2012 | Johnson et al. |
| 9,505,454 | B1 | 11/2016 | Kautsch |
| 2004/0119336 | A1 | 6/2004 | Lussier |
| 2007/0029878 | A1 | 2/2007 | Gaudreault et al. |
| 2012/0242121 | A1 | 9/2012 | Ulrich |
| 2015/0321709 | A1 | 11/2015 | Sewell |
| 2017/0036714 | A1 | 2/2017 | Lunkenbein |
| 2017/0305483 | A1 | 10/2017 | Rehberg |
| 2018/0338413 | A1 | 11/2018 | Connell et al. |
| 2019/0291793 | A1 | 9/2019 | Johnson et al. |
| 2021/0229760 | A1 | 7/2021 | Koizumi et al. |
| 2023/0088453 | A1* | 3/2023 | Shimura ............... B60T 13/746 305/9 |
| 2024/0174309 | A1* | 5/2024 | Takahashi .............. B62D 55/14 |

FOREIGN PATENT DOCUMENTS

| | | | |
|---|---|---|---|
| CN | 207617836 | U | 7/2018 |
| CN | 109398515 | A | 3/2019 |
| CN | 110588813 | A | 12/2019 |
| CN | 215944721 | U | 3/2022 |
| EP | 3406138 | A2 | 11/2018 |
| JP | 2010-058659 | A | 3/2010 |
| JP | 2017-218105 | A | 12/2017 |
| JP | 2025096128 | A * | 6/2025 |
| WO | WO-2006/018215 | A1 | 2/2006 |
| WO | WO-2018/222105 | A1 | 12/2018 |
| WO | WO-2018/224733 | A1 | 12/2018 |

OTHER PUBLICATIONS

Chinese Office Action dated Oct. 10, 2022 issued in corresponding Chinese Appln. No. CN202110108288.4.

Extended European Search Report dated Sep. 12, 2023 for corresponding European Application No. 23154295.2.

* cited by examiner

DEFORMATION OF
ELASTIC BODIES
255a AND 255b

FIG. 8B

DRIVE WHEEL (IN-WHEEL MOTOR)+ TENSIONER

ROTATING WHEEL

FIG. 8A

DRIVE WHEEL

TENSIONER

ROTATING WHEEL

18a

111b

CROSS-SECTION OF CRAWLER

FIG. 20C
FIG. 20B
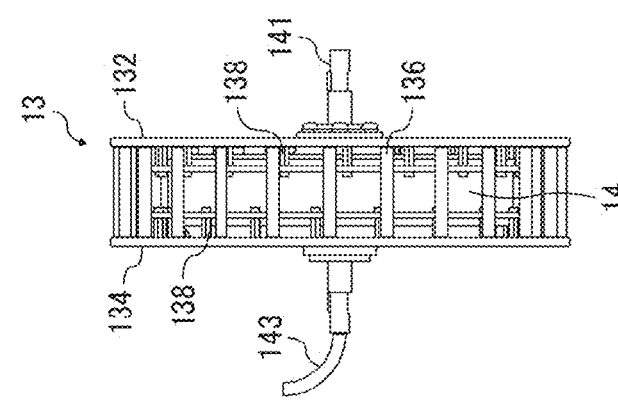
FIG. 20A
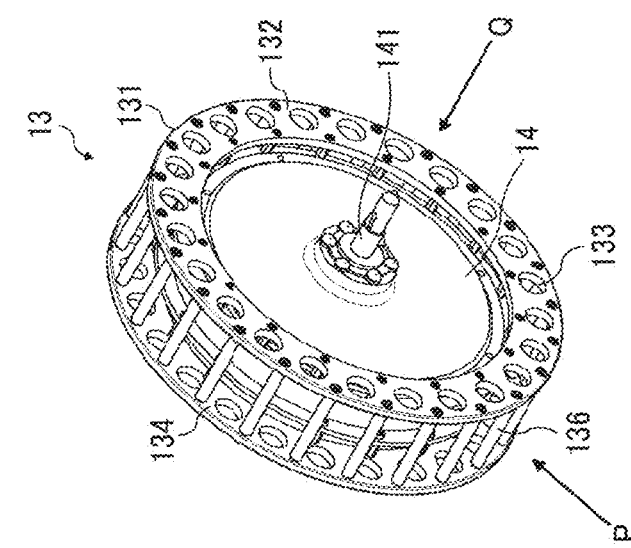

CRAWLER TYPE TRAVELING BODY AND TRAVELING APPARATUS

CROSS-REFERENCE TO RELATED APPLICATIONS

This is a divisional of U.S. application Ser. No. 17/156,917, filed Jan. 25, 2021, which claims priority to Japanese Patent Applications No. 2020-010791, filed on Jan. 27, 2020 and No. 2021-007455, filed on Jan. 20, 2021, the disclosures of each of which are hereby incorporated by reference in their entirety.

BACKGROUND

Technical Field

Embodiments of the present disclosure relate to a crawler type traveling body and a traveling apparatus.

Background Art

Recently, in various environments and applications, mobile robots including traveling apparatuses are utilized to perform works under environments in which humans cannot work and to support humans performing works that have been conventionally performed by humans. Such a traveling apparatus needs a traveling mechanism having high mobility and reliability to travel on a poor road surface environment or a limited space.

SUMMARY

This specification describes an improved crawler type traveling body that includes a drive wheel, an in-wheel motor incorporated in the drive wheel, a plurality of rotating wheels disposed below the drive wheel, a crawler, and a tensioner. The crawler is wound around the drive wheel and the rotating wheels and configured to be rotated by the drive wheel. The tensioner is coupled to a drive shaft of the in-wheel motor and configured to press the drive wheel against the crawler and apply tension to the crawler.

BRIEF DESCRIPTION OF THE DRAWINGS

The aforementioned and other aspects, features, and advantages of the present disclosure would be better understood by reference to the following detailed description when considered in connection with the accompanying drawings, wherein:

FIG. 1A is a perspective view of a traveling apparatus according to an embodiment of the present disclosure;

FIG. 1B is a front view of the traveling apparatus of FIG. 1A;

FIG. 1C is a side view of the traveling apparatus of FIG. 1A;

2

Figure 5B:
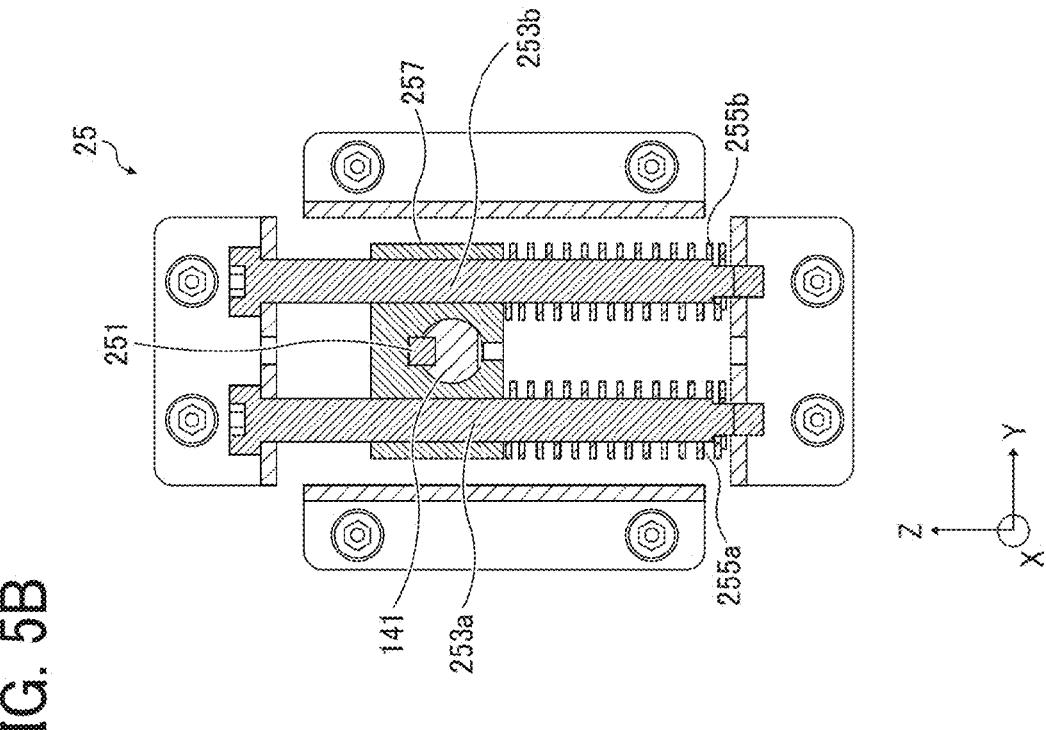
FIG. 5B is a cross-sectional view of the tensioner taken along the line A-A' of FIG. 5A.
Figure 5A:
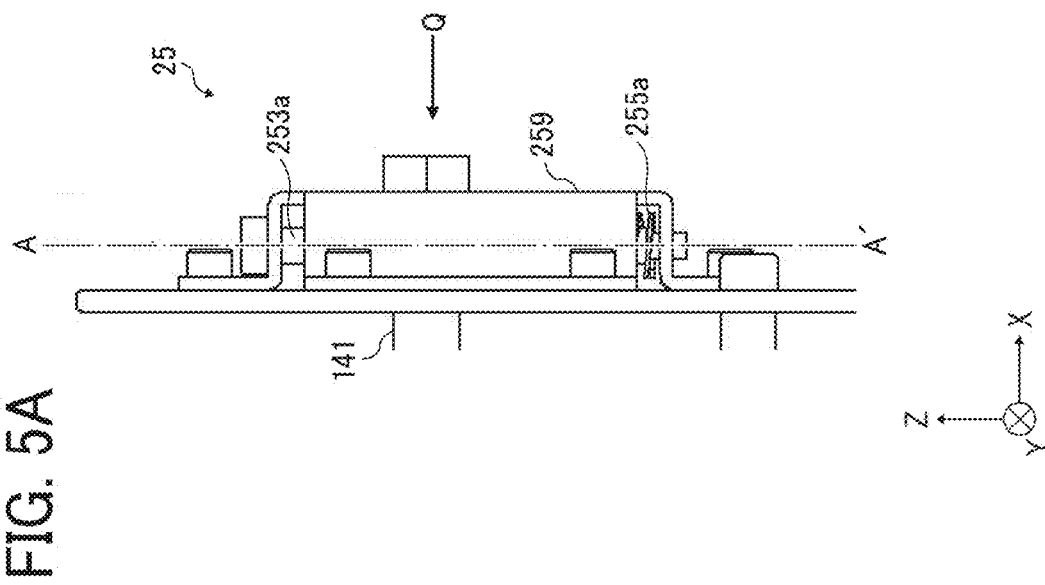
FIG. 5A is a side view of a tensioner attached to the crawler type traveling body of FIG. 3.
Figure 7:
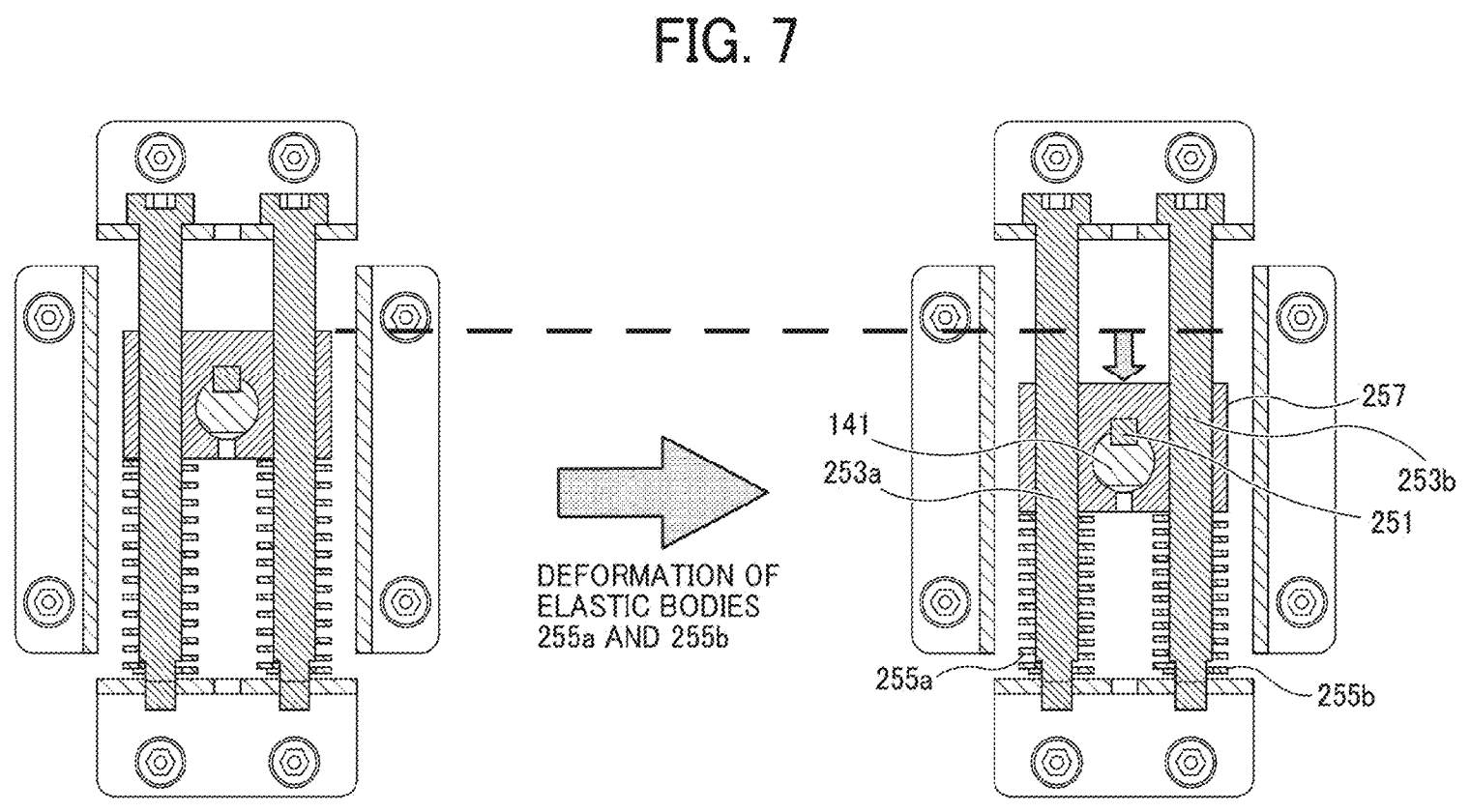
Figure 9:
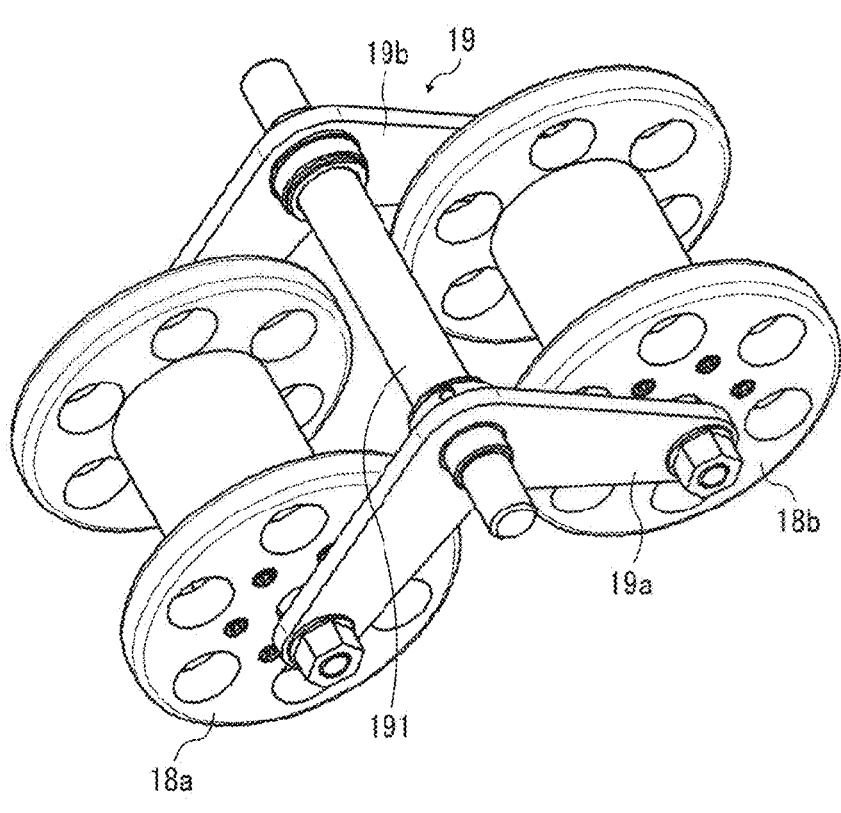
Figure 10C:
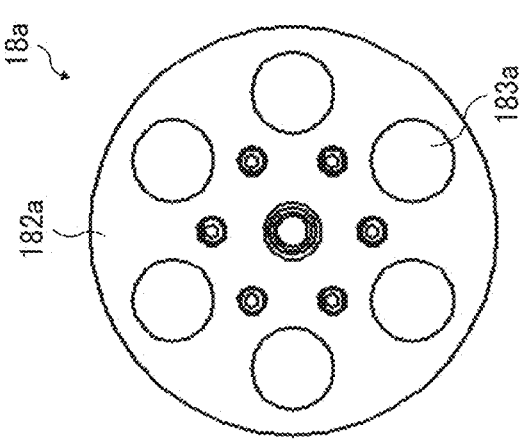
Figure 10B:
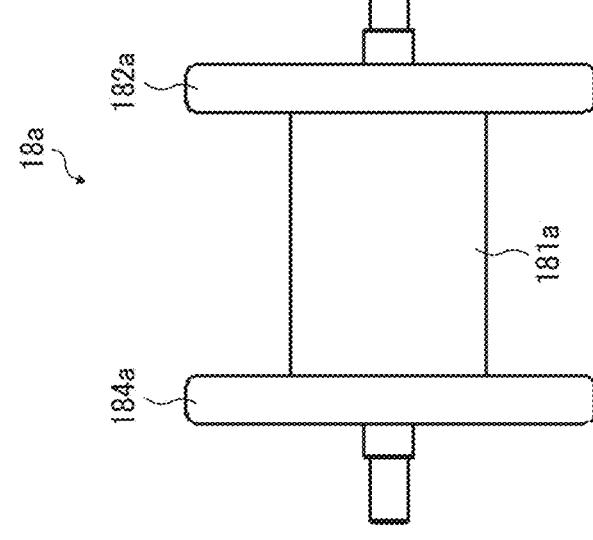
Figure 10A:
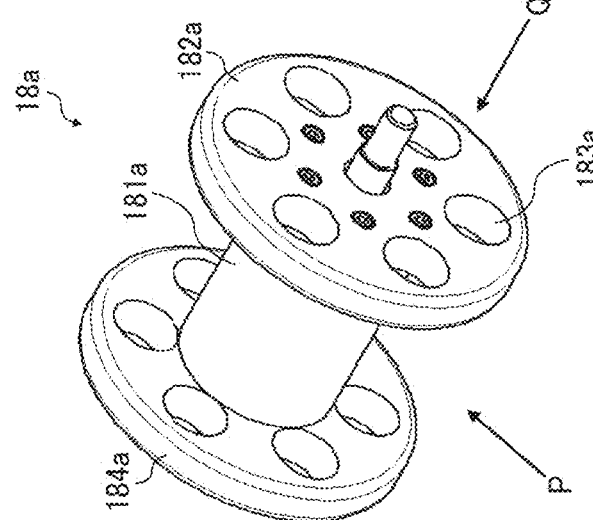
Figure 11:
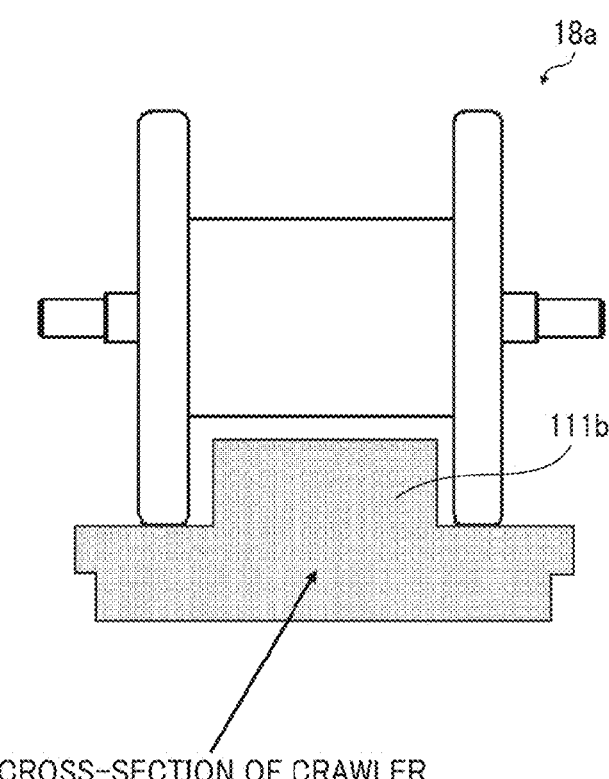
Figure 12:
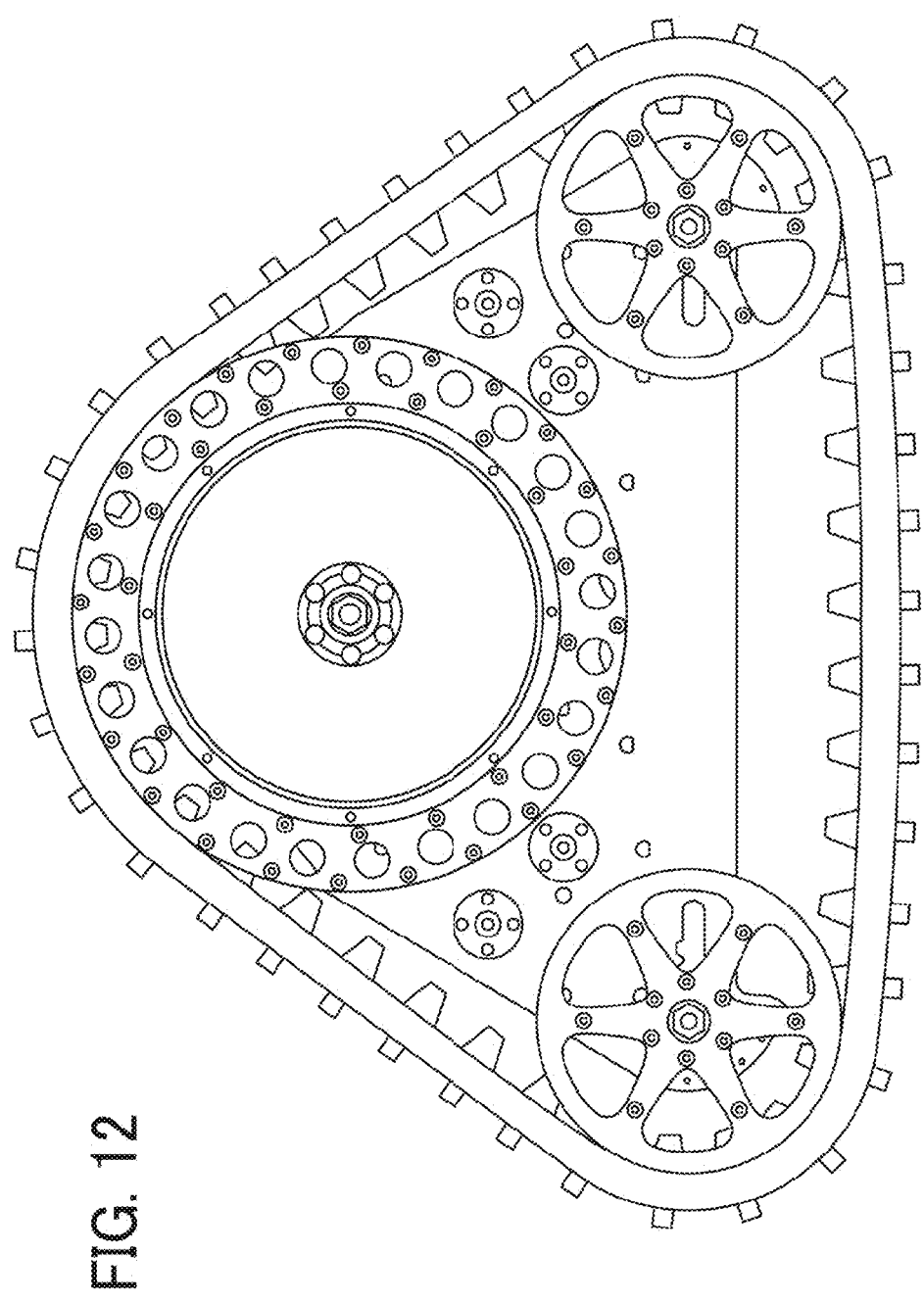
Figure 13:
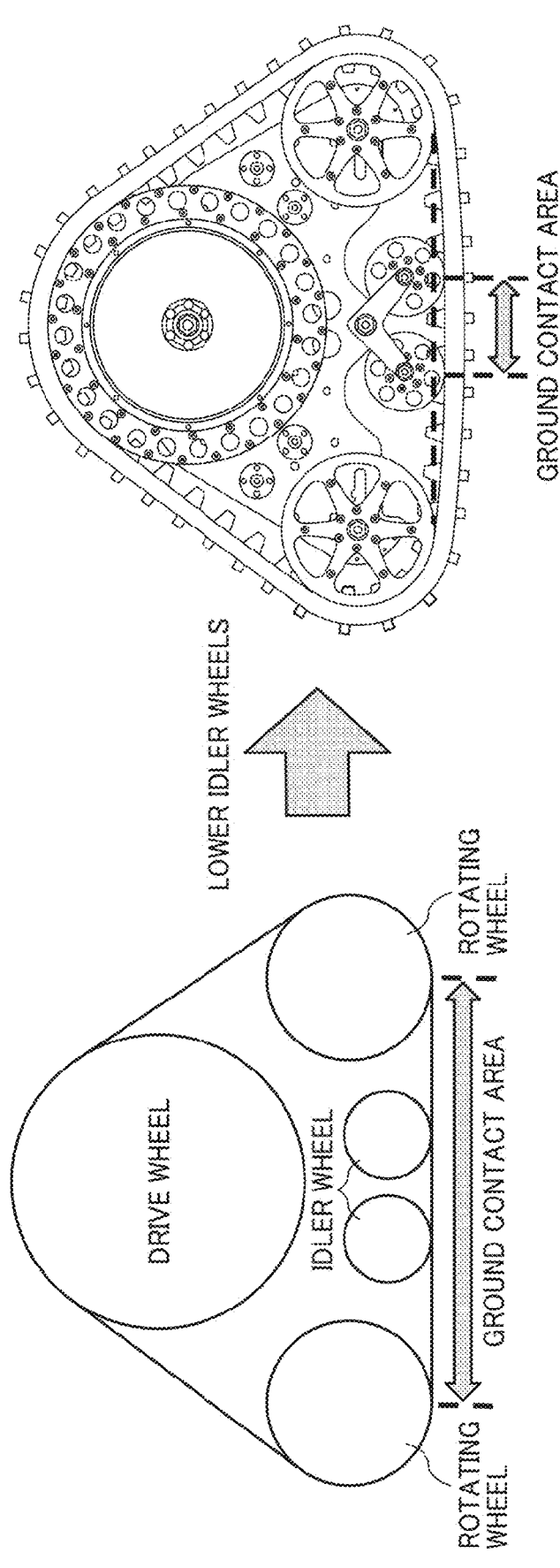
Figure 14B:
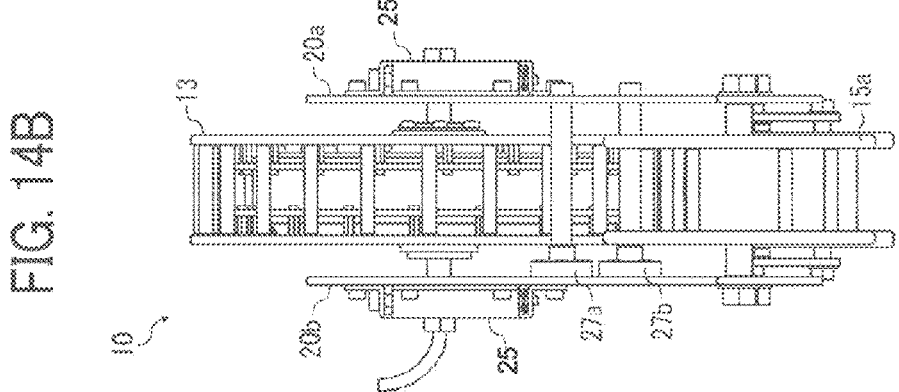
Figure 14A:
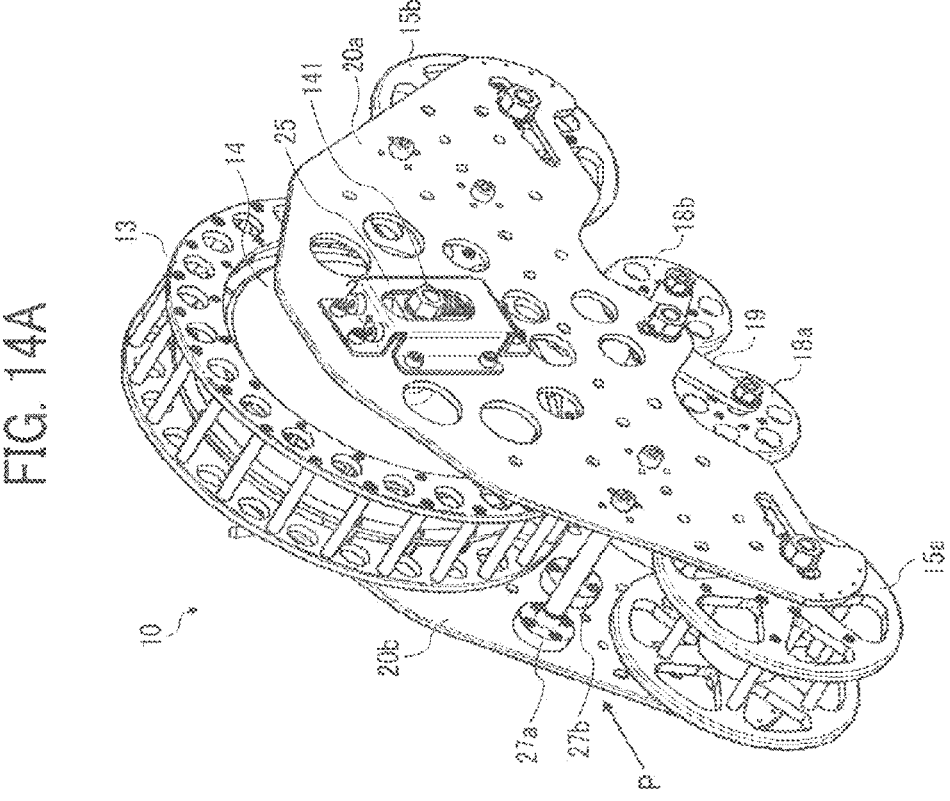
Figure 15:
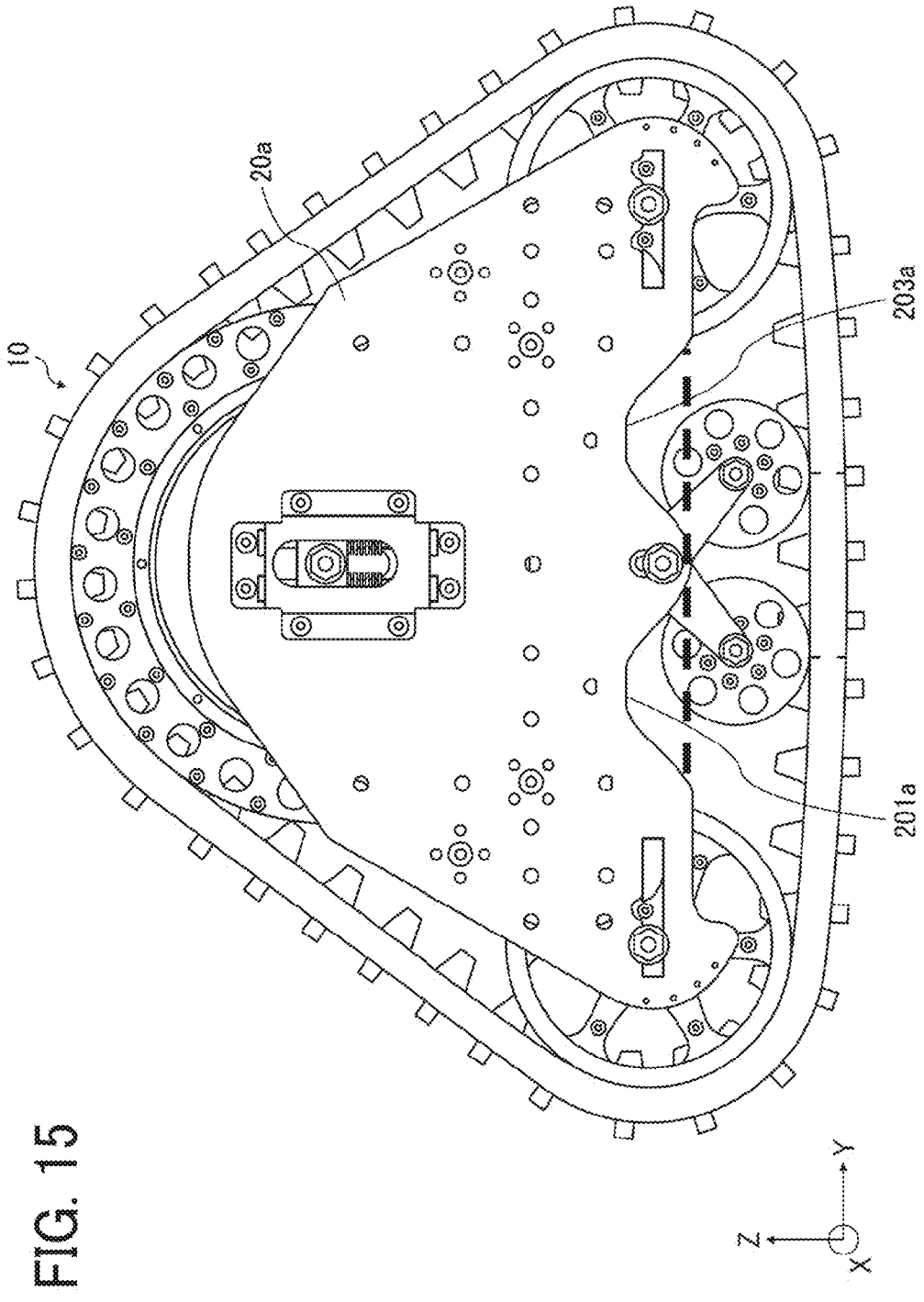
Figure 16:
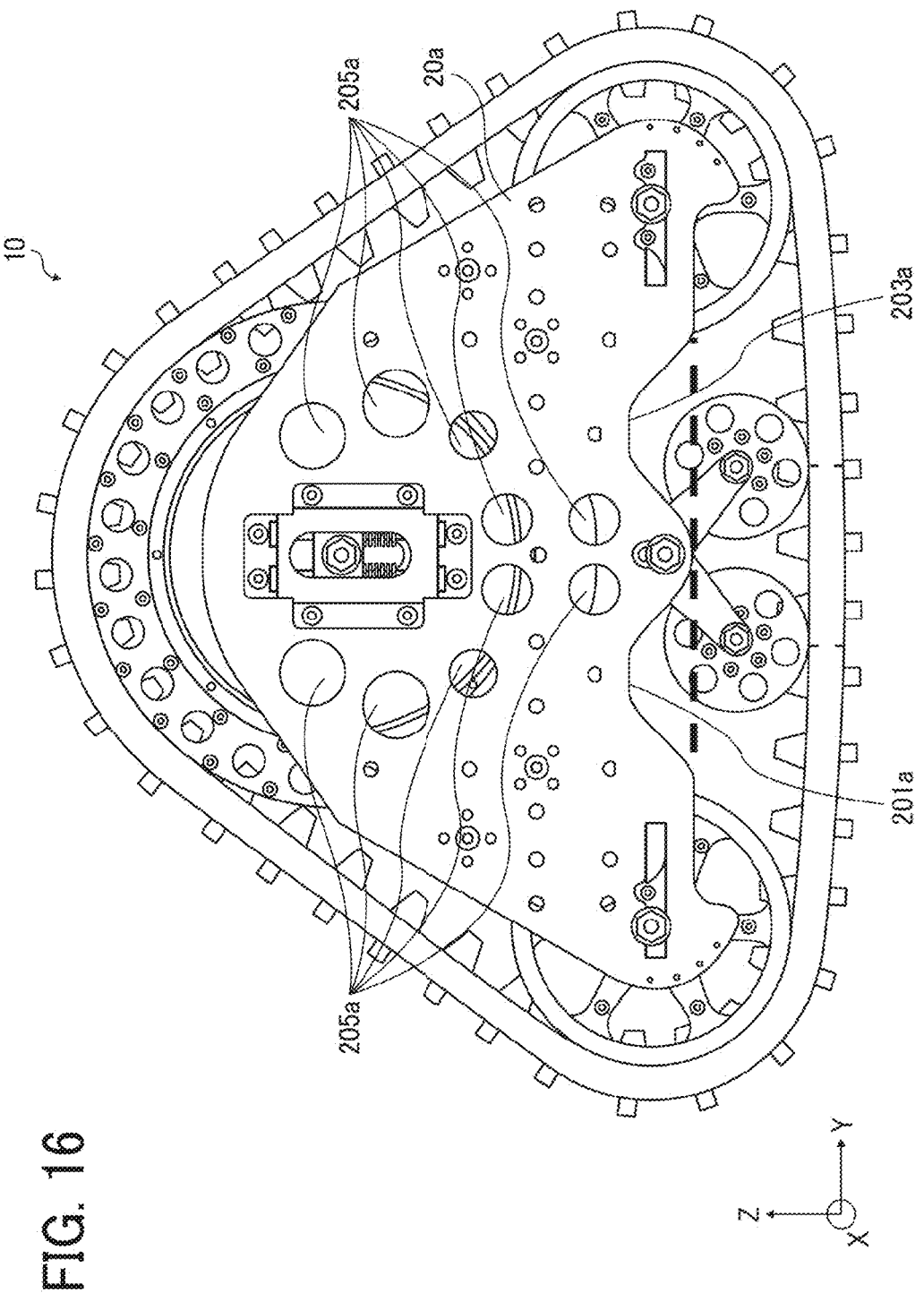
Figures 17A, 17B:
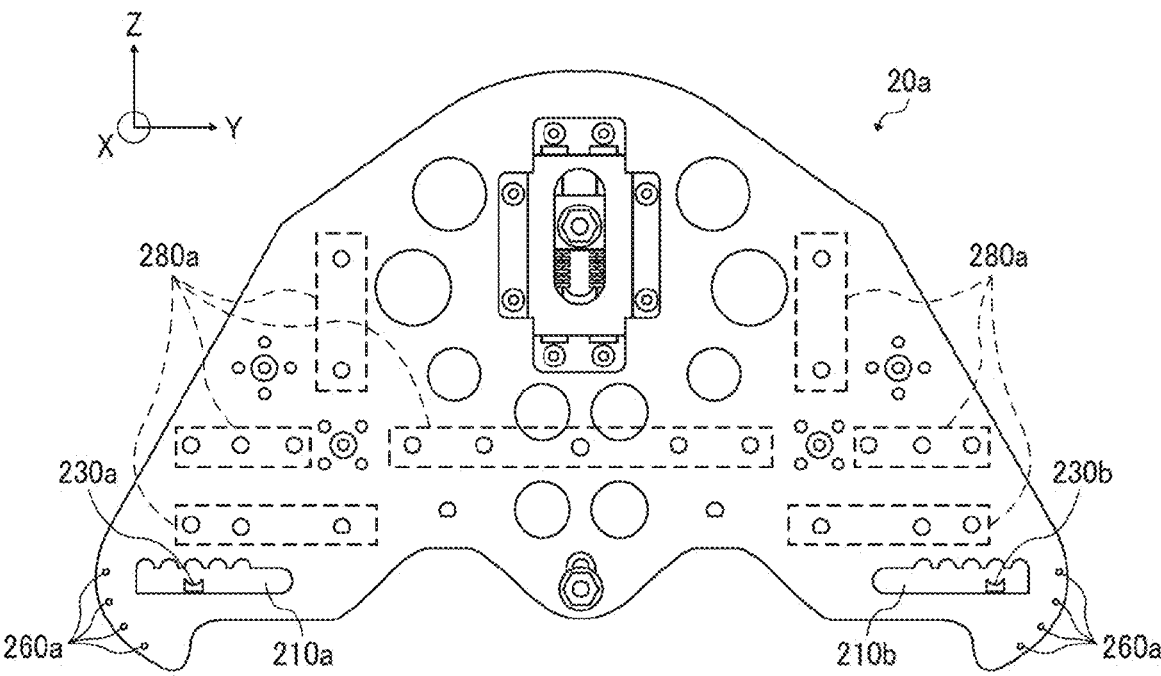
Figure 18:
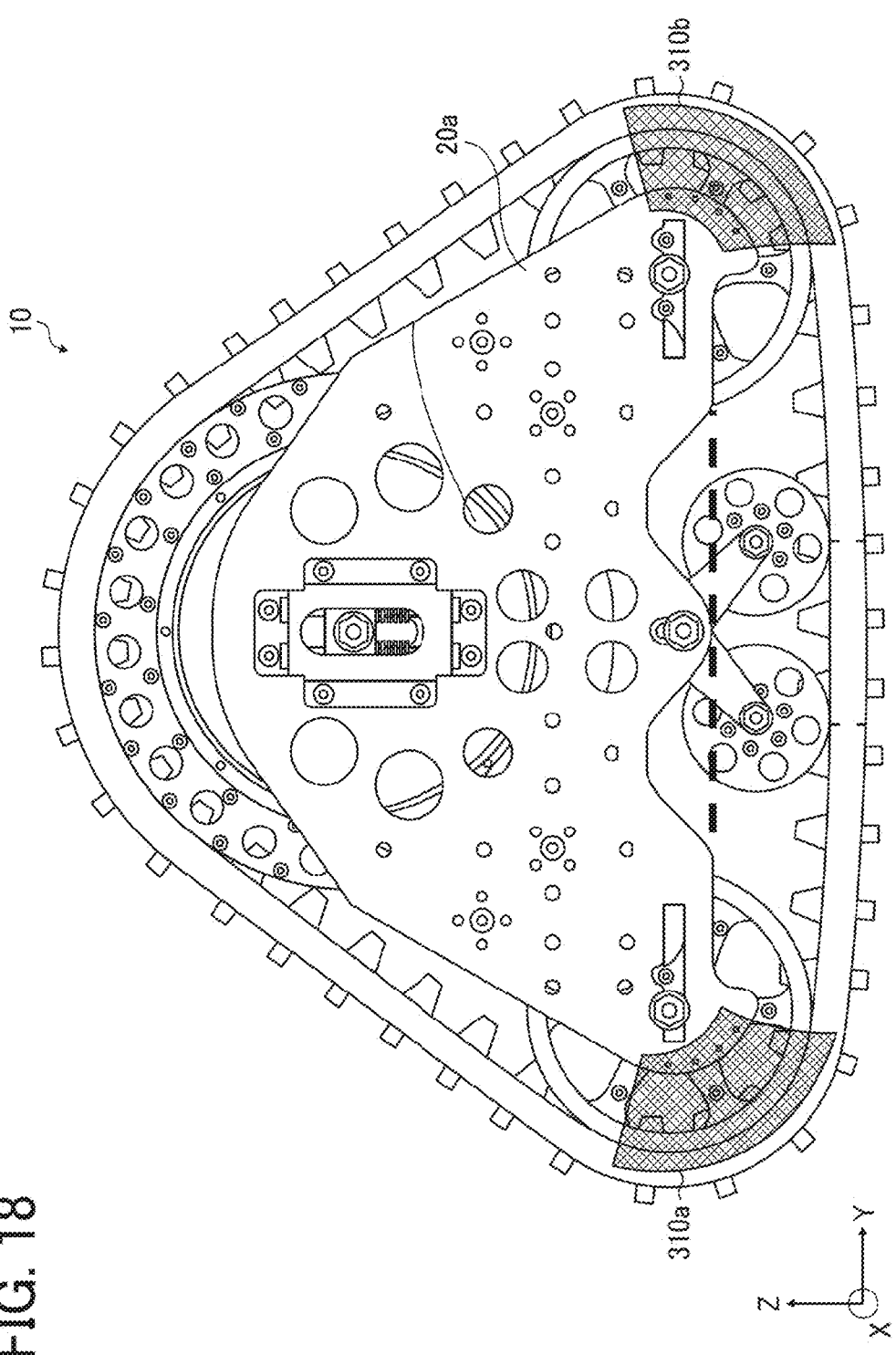
Figure 19:
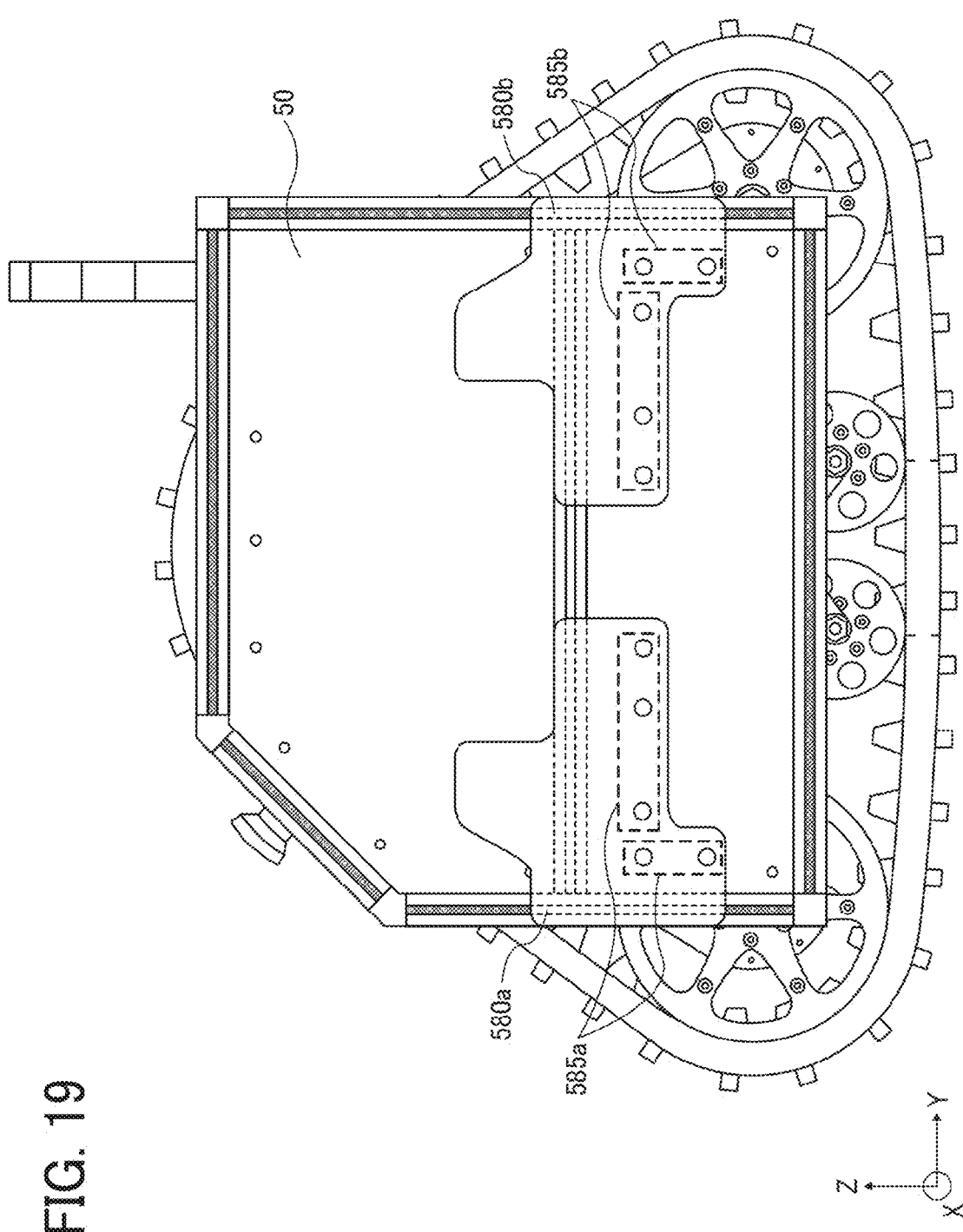
Figure 22:
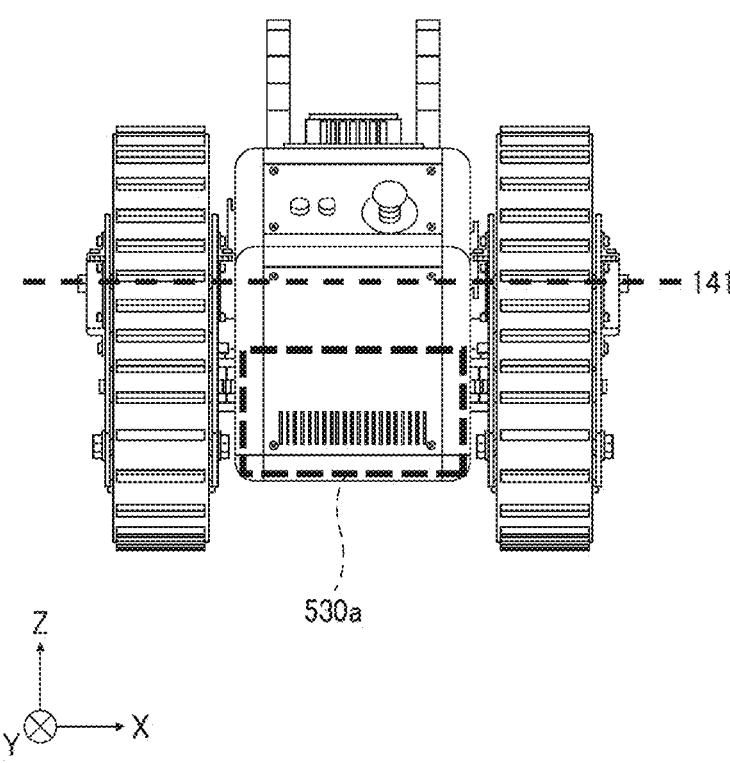
Figure 23B:
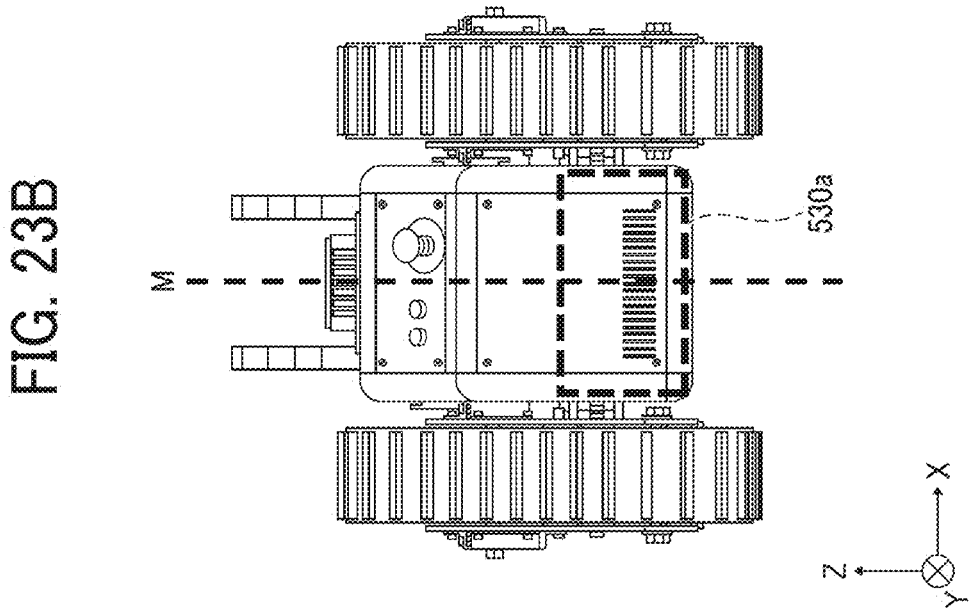
Figure 23A:
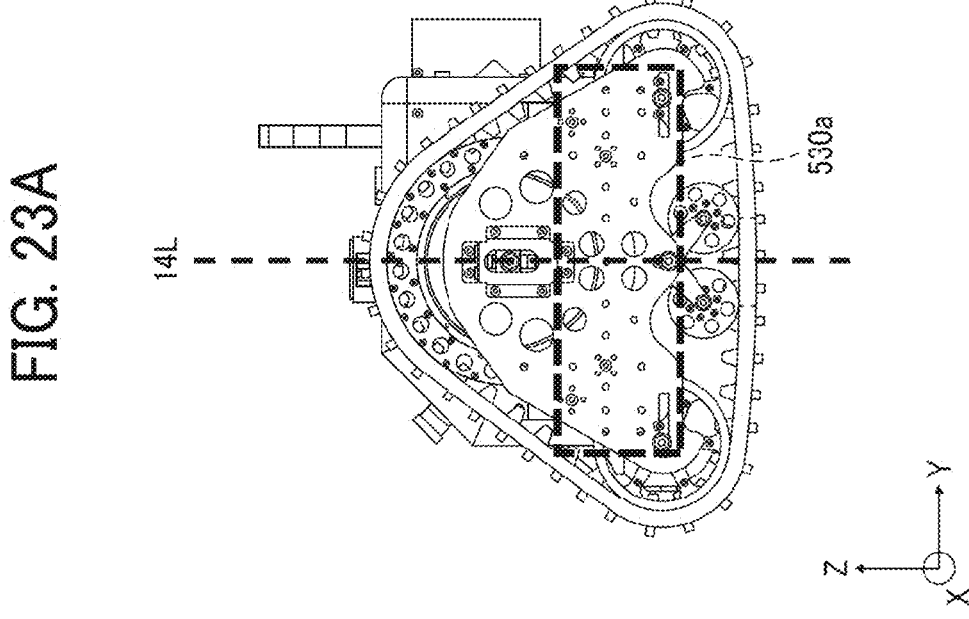

FIG. 7 is a schematic view illustrating a change in a state of the tensioner of FIG. 5A;

Figures 8A, 8B:
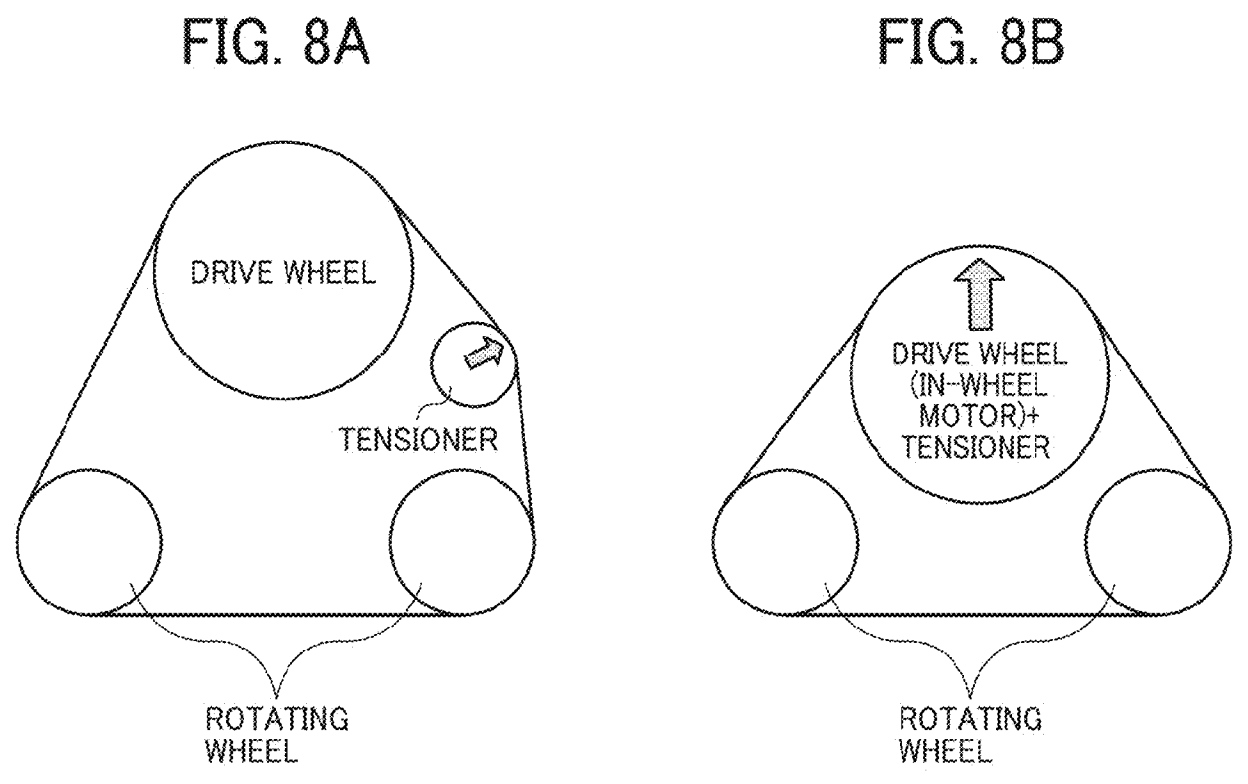

FIG. 8A is a schematic view of a crawler type traveling body according to a comparative embodiment including a tensioner, for illustrating a feature of the tensioner according to the embodiment of the present disclosure;

FIG. 8B is a schematic view of the crawler type traveling body including the tensioner according to the embodiment of the present disclosure;

FIG. 9 is a perspective view of idler wheels and a link of the crawler type traveling body according to the embodiment of the present disclosure;

FIG. 10A is a perspective view of one of the idler wheels according to the embodiment of the present disclosure;

FIG. 10B is a front view of the idler wheel of FIG. 10A;

FIG. 10C is a side view of the idler wheel of FIG. 10A;

FIG. 11 is a schematic view illustrating a structure preventing a crawler from coming off the idler wheel of the crawler track type traveling body according to the embodiment of the present disclosure;

FIG. 12 is a side view of a comparative crawler type traveling body including no idler wheel;

FIG. 13 is a schematic view illustrating a feature of the crawler type traveling body including the idler wheels according to the embodiment of the present disclosure;

FIG. 14A is a perspective view of the crawler type traveling body from which the crawler is removed, for describing a configuration of side plates;

FIG. 14B is a side view of the crawler type traveling body from which the crawler is removed, as viewed from a direction indicated by arrow P in FIG. 14A, for describing the configuration of the side plates;

FIG. 15 is a schematic view illustrating features of the side plate in the crawler type traveling body according to the embodiment of the present disclosure;

FIG. 16 is a schematic view illustrating features of a side plate having side plate holes in the crawler type traveling body according to another embodiment of the present disclosure;

FIG. 17A is a schematic front view of the side plate of FIG. 16 removed from the crawler type traveling body;

FIG. 17B is a schematic perspective view of a shaft holder to fix a wheel shaft of a rotating wheel to the side plate;

FIG. 18 is a side view of the crawler type traveling body including coming-off stoppers according to an embodiment of the present disclosure to prevent the crawler from coming off the wheels;

FIG. 19 is a side view illustrating a side surface of a main body to fix the crawler type traveling body after one of the crawler type traveling bodies is removed from the traveling apparatus;

FIG. 20A is a perspective view of a drive wheel;

FIG. 20B is a front view of the drive wheel viewed from a direction indicated by arrow P in FIG. 20A;

FIG. 20C is a side view of the drive wheel viewed from a direction indicated by arrow Q in FIG. 20A;

Figures 21A, 21B, 21C:
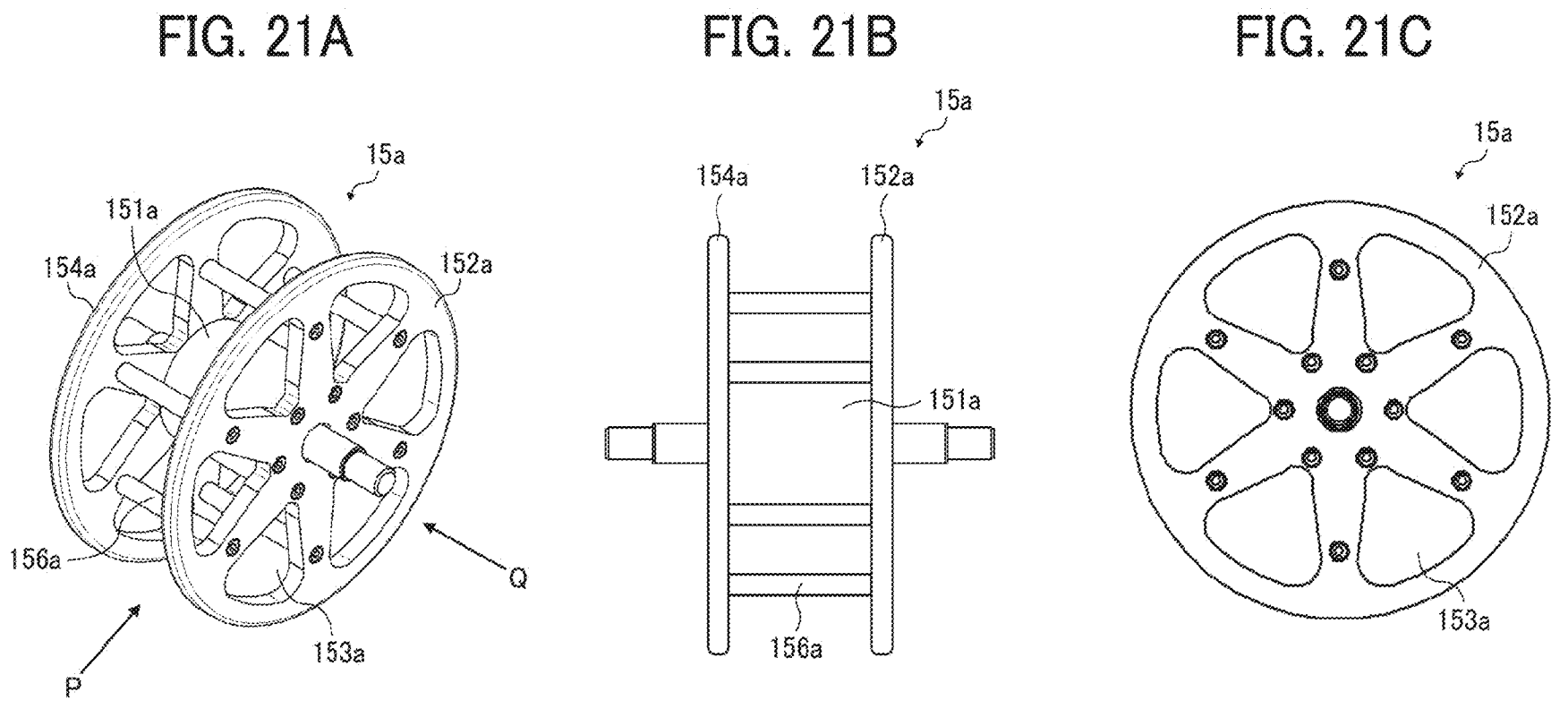

FIG. 21A is a perspective view of the rotating wheel;

FIG. 21B is a front view of the rotating wheel viewed from a direction indicated by arrow P in FIG. 21A;

FIG. 21C is a side view of the rotating wheel viewed from a direction indicated by arrow Q in FIG. 21A;

FIG. 22 is a front view of the traveling apparatus according to the embodiment of the present disclosure, for illustrating a positional relationship between a battery and an in-wheel motor;

FIG. 23A is a side view of the traveling apparatus according to the embodiment of the present disclosure, for illustrating a positional relationship between an installation area for the battery and a center of a shaft of the in-wheel motor; and FIG. 23B is a front view of the traveling apparatus according to the embodiment of the present disclosure, for illustrating a positional relationship between the installation area for the battery and a position of a gravitational center of the traveling apparatus.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Although the embodiments are described with technical limitations with reference to the attached drawings, such description is not intended to limit the scope of the disclosure, and all of the components or elements described in the embodiments of this disclosure are not necessarily indispensable.

A description is given of a traveling apparatus including a crawler type traveling body according to an embodiment of the present disclosure with reference to drawings. In the description of the drawings, the same elements are denoted by the same reference numerals, and redundant descriptions thereof are omitted.

The following is a schematic configuration of the traveling apparatus according to the embodiment.

Figures 1A, 1B, 1C:
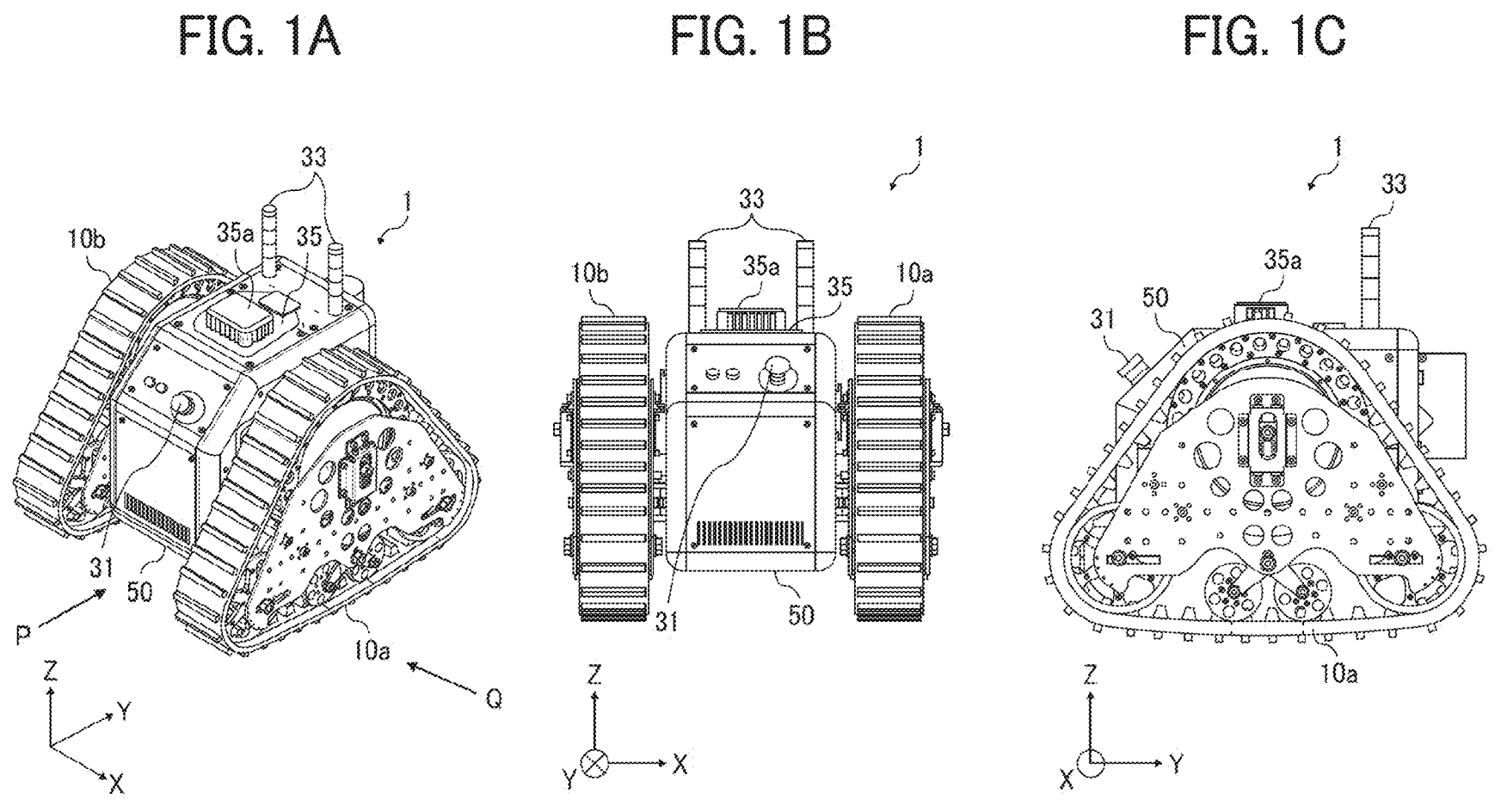

FIG. 1A is a perspective view of the traveling apparatus. The traveling apparatus 1 includes crawler type traveling bodies 10a and 10b and a main body 50.

The crawler type traveling bodies 10a and 10b are structures to move the traveling apparatus 1. The crawler type traveling bodies 10a and 10b use a metallic belt or a rubber belt to move the traveling apparatus 1. The crawler type traveling body has a larger ground contact area than a traveling body that travels with tires such as an automobile and can stably travel even in a poor footing. The traveling body that travels with tires requires a turning space to turn in another direction. In contrast, the traveling apparatus 1 including the crawler type traveling body can perform a so-called ultra-pivotal turn and smoothly turn in another direction even in a limited small area. A detailed structure in the crawler type traveling bodies 10a and 10b is described below.

The main body 50 is a support body that supports the crawler type traveling bodies 10a and 10b in a state in which the crawler type traveling bodies can travel. The main body 50 includes a controller that performs control to drive the traveling apparatus 1. In addition, the main body 50 includes a battery 530 described below to supply electric power for driving the crawler type traveling bodies 10a and 10b.

FIG. 1B is a front view of the traveling apparatus 1 viewed in the direction of arrow Pin FIG. 1A. The main body 50 in the traveling apparatus 1 includes an emergency stop button 31, state indicator lamps 33, and a lid 35. The emergency stop button 31 is an operation device that is pressed by a person around the traveling apparatus 1 to stop traveling the traveling apparatus 1.

The state indicator lamp 33 is a notification device to notify states of the traveling apparatus 1. For example, the state indicator lamp 33 lights up to notify a person around the traveling apparatus 1 a change in a state of the traveling apparatus 1 such as low charge remaining in the battery 530. In addition, the state indicator lamp 33 lights up when an abnormal state may be caused, for example, when an obstacle that hinders traveling of the traveling apparatus 1 is detected. Although the traveling apparatus 1 in FIGS. 1A to 1C includes the two state indicator lamps 33, the number of state indicator lamps 33 is not limited to this and may be one or three or more. Further, the notification device is not limited to the state indicator lamp 33 and may be, for example, a speaker making a warning sound to notify the state of the traveling apparatus 1.

The lid 35 is disposed on the upper surface of the main body 50 and covers the inside of the main body 50. The lid 35 includes a ventilator 35a having an air vent to ventilate the inside of the main body 50.

The main body 50 is sandwiched by the two crawler type traveling bodies 10a and 10b. The crawler type traveling bodies 10a and 10b are disposed in substantially parallel so that the traveling apparatus 1 can travel. The number of crawler type traveling bodies is not limited to two and may be three or more. For example, the traveling apparatus 1 may include three crawler type traveling bodies arranged in parallel so that the traveling apparatus 1 can travel. Alternatively, for example, the traveling apparatus 1 may include four crawler type traveling bodies arranged in the front, rear, right, and left sides like tires of an automobile.

FIG. 1C is a side view of the traveling apparatus viewed from a direction indicated by arrow Q in FIG. 1A. The crawler type traveling body 10a has a triangular shape formed by a drive wheel 13 and two rotating wheels 15a and 15b described below. Even when the size of the traveling body in a traveling direction is limited, the triangular crawler type traveling body 10a can obtain a large ground contact area in the limited size in the traveling direction and improve stability during traveling. On the other hand, a so-called tank type crawler has a longer upper side at which the drive wheel is disposed than a lower side at which a rotating wheel is disposed. As a result, the tank type crawler has a small ground contact area as a whole and becomes unstable when the size of the traveling body in the traveling direction is limited. The crawler type traveling body 10a described above is effective to improve a traveling performance in the relatively small traveling apparatus 1.

Figure 2:
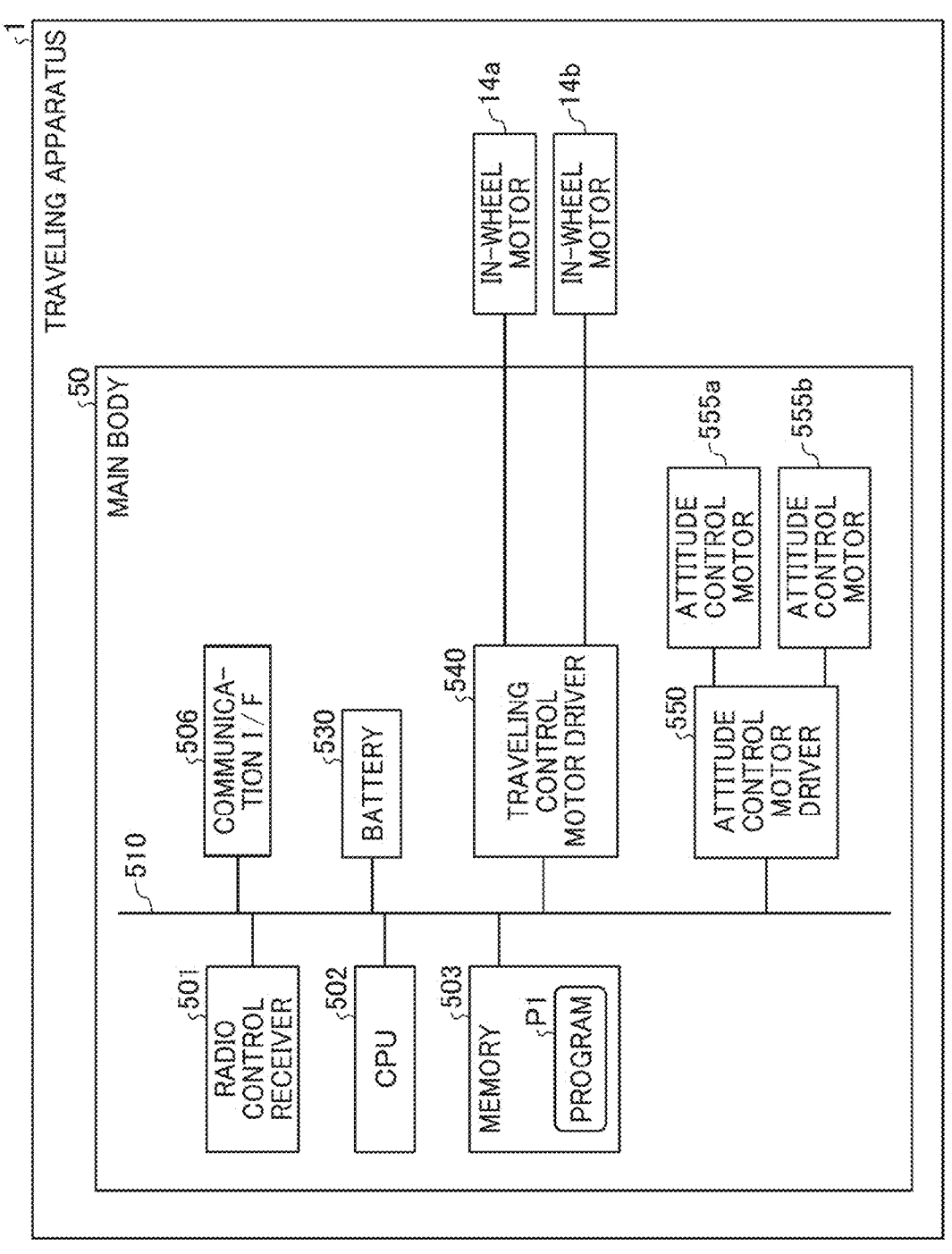
FIG. 2 is a block diagram illustrating a hardware configuration of the traveling apparatus of FIG. 1A.

With reference to FIG. 2, a hardware configuration of the traveling apparatus 1 is described. In the hardware configuration illustrated in FIG. 2, components or elements may be added or deleted as needed.

FIG. 2 is a block diagram illustrating a hardware configuration of the traveling apparatus 1 of FIG. 1A. As illustrated in FIGS. 1A to 1C, the traveling apparatus 1 includes the main body 50 that controls operations of the traveling apparatus 1. Control programs are performed in the main body 50. The main body 50 includes a radio control receiver 501, a central processing unit (CPU) 502, a memory 503, a communication interface (I/F) 506, a battery 530, a traveling control motor driver 540, an attitude control motor driver 550, and attitude control motors 555a and 555b. The radio control receiver 501, the CPU 502, the memory 503, the communication I/F 506, the battery 530, the traveling control motor driver 540, and the attitude control motor driver 550 are connected via a system bus 510. The system bus 510 is an address bus, a data bus, or the like for electrically connecting the above components and transmits an address signal, a data signal, various control signals, and the like.

The radio control receiver 501 receives operation instruction signals transmitted from a transmitter such as a personal computer (PC) used by an operator operating the traveling apparatus 1. The CPU 502 performs an overall control of the traveling apparatus 1. The CPU 502 is an arithmetic device that reads programs P1 and data to drive the traveling apparatus 1 from the memory 503 and executes processing according to the programs and data to implement functions of the traveling apparatus 1.

The memory 503 stores the programs P1 that the CPU 502 executes and various kinds of data necessary for operating the traveling apparatus 1. The programs P1 are preliminarily installed in the memory 503.

The programs P1 can be stored in a computer readable storage medium that the CPU 502 can read, such as a compact disc read only memory (CD-ROM), a flexible disk (FD), a compact disc recordable (CD-R), and a digital versatile disk (DVD), in an installable or executable file format, for distribution. The programs P1 may be stored in a computer connected to a network such as the Internet and downloaded in the traveling apparatus 1 via the network. The programs P1 may be provided or distributed via the network such as the Internet. When the programs P1 are provided via the network, the CPU 502 reads the programs P1 via the communication I/F 506. Instead of the CPU 502 that operates in accordance with the programs P1, a hardware including a dedicated application specific integrated circuit (ASIC) that has the same calculation function and control function as those executed by the programs P1 may drive the traveling apparatus 1.

The communication I/F 506 connects and communicates with other devices or apparatuses via a communication network. The communication I/F 506 is, for example, a communication interface such as a wired or wireless local area network (LAN). The communication I/F 506 may include a communication interface such as 3rd Generation (3G), Long Term Evolution (LTE), 4th Generation (4G), 5th Generation (5G), Wireless Fidelity (Wi-Fi) (registered trademark), Worldwide Interoperability for Microwave Access (WiMAX), Zigbee (registered trademark), or millimeter wave wireless communication. The traveling apparatus 1 may include a communication circuit to perform short-range wireless communication such as near field communication (NFC) or Bluetooth (registered trademark).

The battery 530 supplies power to perform operations or processing of the traveling apparatus 1. For example, the battery 530 supplies power to the in-wheel motors 14a and 14b and the attitude control motors 555a and 555b.

The traveling control motor driver 540 supplies motor drive signals to the in-wheel motors 14a and 14b to drive the in-wheel motors 14a and 14b.

The in-wheel motors 14a and 14b are disposed inside the drive wheel 13 of the crawler type traveling body 10a and the drive wheel 13 of the crawler type traveling body 10b, respectively, and transmit torque to the drive wheels 13. The in-wheel motors 14a and 14b rotate the drive wheels 13 in a positive direction to move the traveling apparatus 1 forward or in a negative direction to move the traveling apparatus 1 backward. The in-wheel motors 14a and 14b rotate only one of the drive wheels 13 in the positive direction or the negative direction and stop the other one of the drive wheels 13 to cause a pivotal turn of the traveling apparatus 1. In addition, the in-wheel motors 14a and 14b rotate one of the drive wheels 13 in the positive direction and rotate the other one of the drive wheels 13 in the negative direction to cause an ultra-pivotal turn of the traveling apparatus 1.

The attitude control motor driver 550 supplies motor drive control signals to the attitude control motors 555a and 555b to drive the attitude control motors 555a and 555b. The attitude control motors 555a and 555b receive attitude control signals from the attitude control motor driver 550 and vertically change the height of a link 19 described below to adjust the heights of the idler wheels 18a and 18b. In addition, the attitude control motors 555a and 555b control the attitude of the main body 50 and, for example, prevents the traveling apparatus 1 from falling down.

The traveling apparatus 1 is not limited to the above-described apparatus that travels in accordance with operation instructions received by the radio control receiver 501 and may be configured to travel using a technique such as autonomous traveling or line tracing. Alternatively, the traveling apparatus 1 may include the communication I/F 506 that receives operation instruction signals transmitted via a communication network by a user at a remote place and travel based on a remote control from the user.

Figure 3:
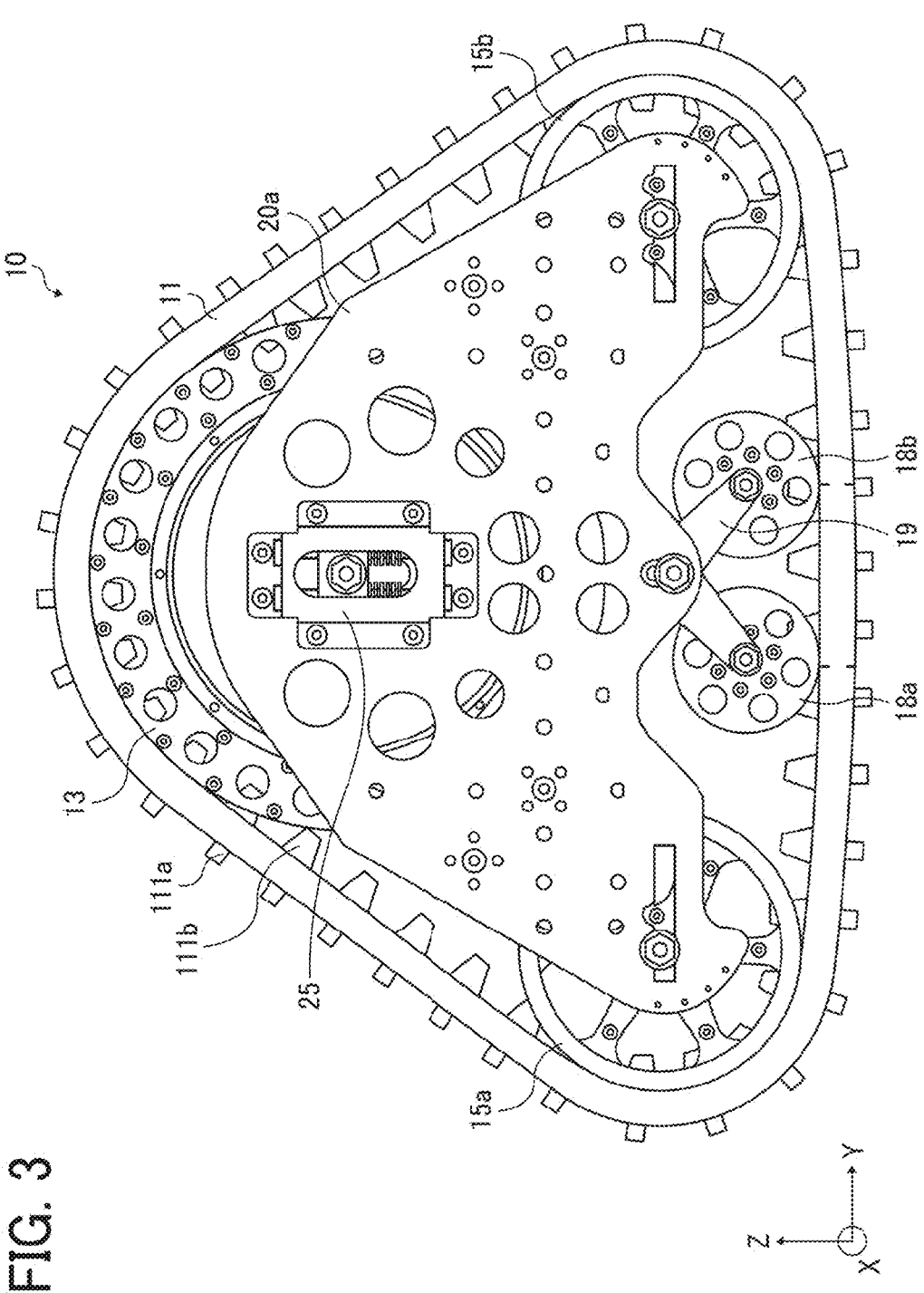
FIG. 3 is a side view of a crawler type traveling body according to an embodiment of the present disclosure.
Figure 4:
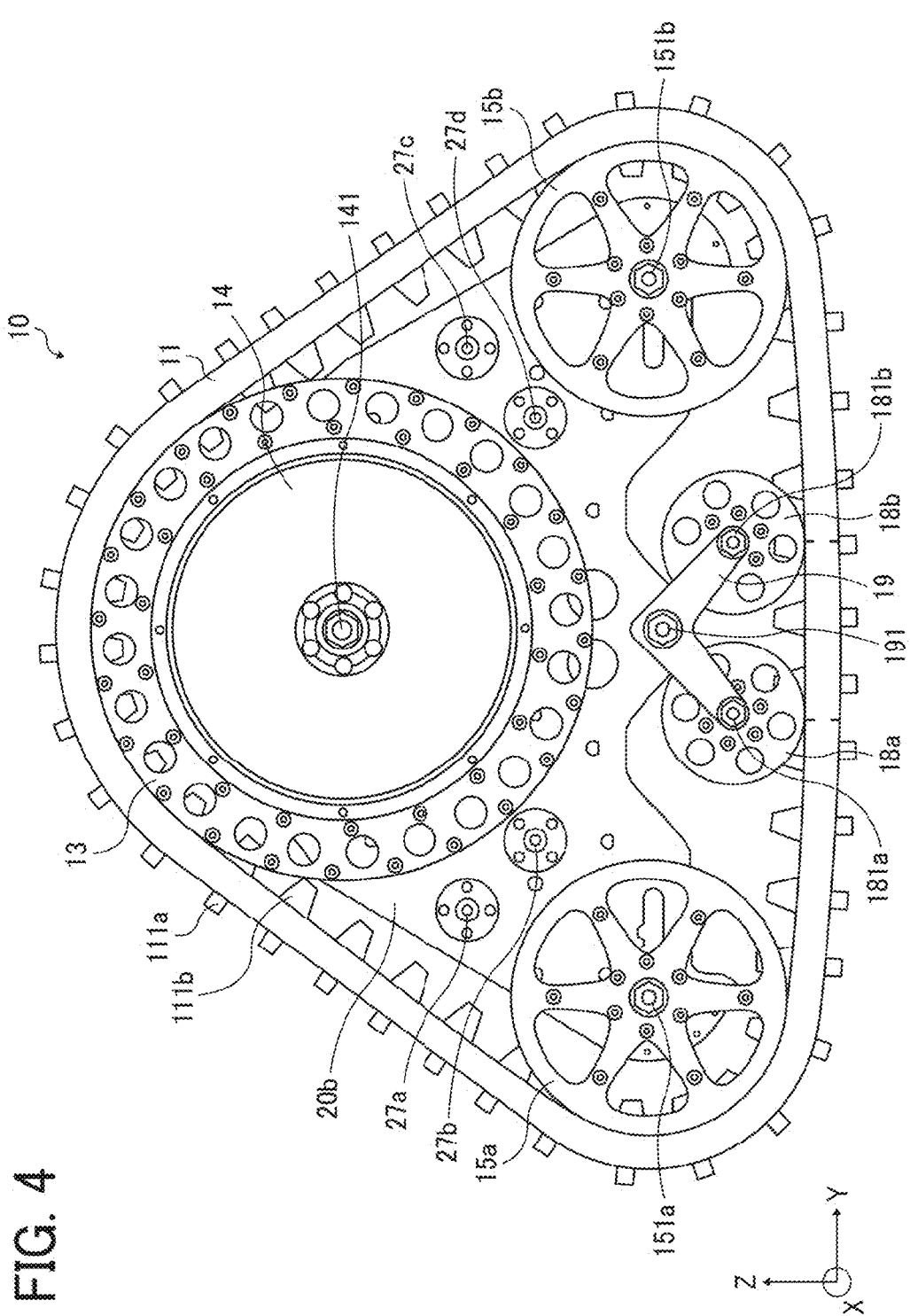
FIG. 4 is a side view illustrating the crawler type traveling body of FIG. 3 with a side plate removed.

Next, the crawler type traveling bodies 10a and 10b in the traveling apparatus 1 is described with reference to FIGS. 3 to 21C. Firstly, with reference to FIGS. 3 and 4, the overall configuration of the crawler type traveling bodies 10a and 10b is described. As illustrated in FIGS. 1A to 1C, the traveling apparatus 1 includes the two crawler type traveling bodies 10a and 10b. Since the two crawler type traveling bodies have the same configuration, the suffixes are omitted in the following description, hereinafter referred to as the crawler type traveling body 10. FIG. 3 is a side view of the crawler type traveling body 10 according to the present embodiment viewed from the same direction of FIG. 1C, that is, the direction indicated by arrow Q in FIG. 1A. FIG. 4 is a side view illustrating the crawler type traveling body 10 of FIG. 3 with a side plate removed.

As illustrated in FIG. 3, the crawler type traveling body 10 includes the crawler 11, the drive wheel 13, the rotating wheels 15a and 15b, the idler wheels 18a and 18b, the link 19, a side plate 20a, and a tensioner 25. The crawler type traveling body 10 illustrated in FIG. 4 additionally includes the in-wheel motor 14, a motor shaft 141, a side plate 20b, side plate supports 27a, 27b, 27c, and 27d, rotating wheel shafts 151a and 151b, idler wheel shafts 181a and 181b, and a link shaft 191.

The crawler 11 is made of metal or rubber. The crawler 11 is wound around the drive wheel 13 and the rotating wheels 15a and 15b. The crawler 11 is driven by the drive wheel 13. The crawler 11 drives the rotating wheels 15a and 15b and moves the crawler type traveling body 10. The crawler 11 has a plurality of projections 111a and 111b on the surfaces of the crawler 11. The projections 111a are disposed on the outer surface of the crawler 11 to ride over a small obstacle such as a stone on a road surface and stably travel on a road. The projections 111b are disposed on the inner surface of the crawler 11 to prevent the crawler 11 from coming off a wheel such as the drive wheel 13 or the rotating wheels 15a and 15b.

The drive wheel 13 transmits a driving force to the crawler 11 to move the crawler type traveling body 10. In the crawler type traveling body 10, the in-wheel motor 14 transmits the driving force to the drive wheel 13 to rotate the drive wheel 13, and the driving force drives the rotating wheels 15a and 15b via the crawler 11.

The in-wheel motor 14 is built in the drive wheel 13 and rotates the drive wheel 13. The in-wheel motor 14 includes the motor shaft 141 serving as a drive shaft and rotates on the motor shaft 141. A rotation shaft (that is, the motor shaft 141) of the in-wheel motor 14 serves as the rotation shaft (that is, the drive shaft) of the drive wheel 13, and the rotational force of the in-wheel motor 14 rotates the drive wheel 13. The drive wheel 13 transmits the rotational force of the in-wheel motor 14 to the crawler 11 as a driving force. The in-wheel motor 14 rotates the drive wheel 13 in a positive direction to move the traveling apparatus 1 forward or in a negative direction to move the traveling apparatus 1 backward.

The in-wheel motor 14 built in the drive wheel 13 simplifies the structure of the crawler type traveling body 10. For example, the in-wheel motor 14 built in the drive wheel 13 does not use a component such as a drive chain or a gear. As a result, the in-wheel motor 14 built in the drive wheel 13 can reduce risk such as a failure caused by the component. In addition, the in-wheel motor 14 built in the drive wheel 13 can generate a driving force in the vicinity of the outer periphery of the crawler type traveling body 10, so that the in-wheel motor 14 can generate a large torque.

The rotating wheels 15a and 15b are rotatably attached to the crawler type traveling body 10. The driving force (the rotational force) transmitted from the drive wheel 13 via the crawler 11 rotates the rotating wheels 15a and 15b about the rotating wheel shafts 151a and 151b as rotation shafts.

The drive wheel 13 and the rotating wheels 15a and 15b form a triangle when viewed from the side. The crawler 11 is wound around the drive wheel 13 and the rotating wheels 15a and 15b and contacts the ground in a range between the rotating wheels 15a and 15b. That is, the drive wheel 13 including the in-wheel motor 14 therein does not contact the road surface. As a result, the crawler type traveling body 10 has an advantage. For example, the in-wheel motor 14 does not need a special waterproof mechanism because the in-wheel motor 14 does not sink in the water even when the crawler type traveling body 10 travels in a puddle.

As illustrated in FIG. 4, the diameter of the drive wheel 13 is different from the diameter of each of the rotating wheels 15a and 15b. Layouts of traveling bodies are designed considering required factors such as size limitation and traveling performances. In general, the torque per unit width of a motor tends to decrease as the diameter of the motor decreases. Accordingly, the diameter of the drive wheel incorporating the in-wheel motor becomes equal to or larger than the diameter of the motor satisfying the required torque performance. As a result, the layout of the crawler type traveling body 10 is designed such that the diameter of the drive wheel 13 disposed on an upper portion of the crawler type traveling body 10 is larger than the diameter of each of the rotating wheels 15a and 15b to satisfy the required traveling performance and the size limitation of the traveling apparatus 1 and the crawler type traveling body 10. In addition, increasing the diameter of the rotating wheel under the size limitation reduces the ground contact area, which is not preferable to obtain a stable traveling performance. Accordingly, designing the diameter of each of the rotating wheels 15a and 15b smaller than the diameter of the drive wheel 13 has advantages.

The idler wheels 18a and 18b are auxiliary wheels disposed between the two rotating wheels 15a and 15b and driven to rotate by the crawler 11. The idler wheels 18a and 18b rotate about the idler wheel shafts 181a and 181b, respectively. The link 19 is a support member that supports the idler wheels 18a and 18b.

The side plates 20a and 20b support the drive wheel 13, the rotating wheels 15a and 15b, and the idler wheels 18a and 18b in the crawler type traveling body 10. The crawler type traveling body 10 has a double-sided structure. That is, two side plates 20a and 20b are used to support the drive wheel 13 and the rotating wheels 15a and 15b. A plurality of side plate supports 27a, 27b, 27c, and 27d support the two side plates 20a and 20b. The side plates 20a and 20b support the drive wheel 13 using the motor shaft 141. The side plates 20a and 20b support the rotating wheels 15a and 15b using the rotating wheel shafts 151a and 151b, respectively. Additionally, the side plates 20a and 20b support the idler wheels 18a and 18b using the link shaft 191 of the link 19. The link 19 supports the idler wheels 18a and 18b.

The tensioner 25 includes an elastic member such as a spring and is coupled to the motor shaft 141 that is the rotation shaft of the in-wheel motor 14 and the drive wheel 13. The tensioner 25 is disposed so that the drive wheel 13 is pressed against the inside of the crawler 11 to apply tension to the crawler 11. In the crawler type traveling body 10, the tensioner 25 adjusts tension of the crawler 11 so that the crawler 11 maintains normal transmission of driving force.

As illustrated in FIGS. 3 and 4, the crawler type traveling body 10 has a substantially symmetrical structure in a traveling direction with respect to a center of the drive wheel 13. Specifically, the crawler type traveling body 10 has a substantially symmetrical structure with respect to a vertical line passing through the motor shaft 141 of the in-wheel motor 14 in a side view that is viewed from in the X axis direction as illustrated in FIGS. 3 and 4. In other words, the crawler type traveling body 10 has a substantially symmetrical structure with respect to a line passing through the motor shaft 141 and being orthogonal to a line that connects shafts of the two rotating wheels 15a and 15b.

For example, traveling apparatuses that travel in a narrow space such as a corridor of an office frequently perform forward and backward movement and the ultra-pivotal turn. If a traveling apparatus is asymmetrical in the shape of the crawler or the arrangement of the drive wheel, the rotating wheels, and the tensioner with respect to a line orthogonal to a line in the traveling direction, traveling characteristics in moving forward may be different from traveling characteristics in moving backward, and the traveling apparatus may not be able to perform the ultra-pivotal turn about the center of the traveling apparatus. Hence, the crawler type traveling body 10 having the symmetrical structure (that is the symmetrical layout) related to the traveling direction can improve the stability during traveling of the traveling apparatus 1 and simplify the control of the traveling apparatus 1. The crawler type traveling body 10 having the symmetrical structure can be attached to both of the right and left sides of the traveling apparatus 1, thus reducing the number of parts.

Next, with reference to FIGS. 5A to 8B, the tensioner 25 in the crawler type traveling body 10 is described in detail. FIG. 5A is a side view of the tensioner 25 according to the present embodiment attached to the crawler type traveling body 10. The tensioner 25 is coupled to the motor shaft 141 of the in-wheel motor 14. The tensioner 25 presses the drive wheel 13 against the crawler 11 to apply tension to the crawler 11. FIG. 5A illustrates the tensioner 25 attached to the side plate 20a and covered by an exterior cover 259. The tensioner 25 is coupled to the motor shaft 141 of the in-wheel motor 14 built in the drive wheel 13.

Figure 6:
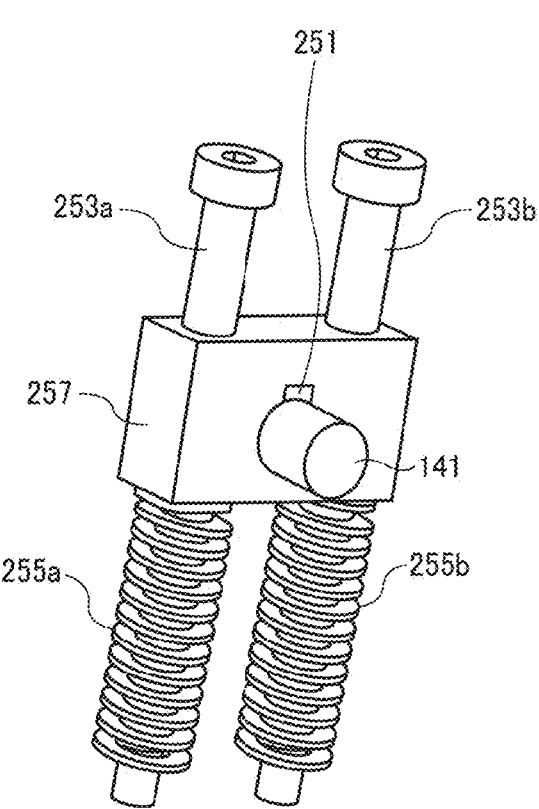
FIG. 6 is a perspective view of the tensioner of FIG. 5A.

FIG. 5B is a cross-sectional view of the tensioner 25 taken along the line A-A' of FIG. 5A viewed in the direction indicated by arrow Q in FIG. 5A. FIG. 6 is a perspective view of the tensioner 25 according to the present embodiment, illustrating the configuration of the tensioner 25. The tensioner 25 includes a fastener 251, shafts 253a and 253b, elastic bodies 255a and 255b, and a block 257.

The fastener 251 fixes the motor shaft 141 that is a rotation shaft of the drive wheel 13 and the in-wheel motor 14 to the block 257. In the tensioner 25, the fastener 251 fixes the motor shaft 141 to the block 257 to stop rotation of the motor shaft 141.

The shafts 253a and 253b guide elastic deformation of the elastic bodies 255a and 255b, respectively. The elastic bodies 255a and 255b are elastic members such as springs disposed along the shafts 253a and 253b, respectively. The elastic bodies 255a and 255b are elastically deformed in the vertical direction with the shafts 253a and 253b as guides.

In the block 257, the motor shaft 141 penetrates the block 257 to couple the tensioner 25 to the motor shaft 141. Additionally, the shafts 253a and 253b penetrate the block 257, and the block 257 slides in the axial direction of the shafts along the shafts 253a and 253b. The above-described configuration enables the tensioner 25 to move the motor shaft 141, which is disposed at the center of the drive wheel 13, in the vertical direction in conjunction with the deformation of the elastic bodies 255a and 255b. In the crawler type traveling body 10, a restoring force generated by the deformation of the elastic bodies 255a and 255b pushes the motor shaft 141 upward, and the drive wheel 13 itself as a tensioner is pressed against the crawler 11, thereby applying tension to the crawler 11.

FIG. 7 is a schematic view illustrating a change in the state of the tensioner 25 according to the embodiment of the present disclosure. Force applied to the drive wheel 13 in the vertical direction deforms the elastic bodies 255a and 255b, and the elastic bodies 255a and 255b expand or contract as illustrated in FIG. 7. The left drawing of FIG. 7 that is the same as FIG. 5B illustrates a state of the tensioner 25 in which the elastic bodies 255a and 255b expand to apply tension to the crawler 11. The right drawing of FIG. 7 illustrates a state of the tensioner 25 in which the elastic bodies 255a and 255b are contracted by force applied to the drive wheel 13 downward. For example, when the crawler 11 hits an obstacle on a road surface during traveling, the elastic bodies 255a and 255b contract or expand to absorb change in tension applied to the crawler 11, thus reducing damage to the crawler 11 in the crawler type traveling body 10.

With reference to FIGS. 8A and 8B, the following describes a feature of the crawler type traveling body 10 according to the present embodiment. FIG. 8A is a schematic view of a triangular crawler type traveling body according to a comparative embodiment including a tensioner, for illustrating a feature of the tensioner 25 according to the present embodiment. FIG. 8B is a schematic view of the crawler type traveling body 10 including the tensioner 25 according to the present embodiment. Increasing the torque of the in-wheel motor requires increasing the diameter of the in-wheel motor. The triangular crawler type traveling body includes the drive wheel incorporating the in-wheel motor disposed in the upper portion of the traveling body. Since increasing the diameter of the in-wheel motor increases the weight of the in-wheel motor that is generally heavy, the position of the gravitational center in the traveling body including the drive wheel disposed in the upper portion becomes high, which deteriorates the traveling stability. In addition, as illustrated in FIG. 8A, the triangular crawler type traveling body according to the comparative embodiment includes a tensioner wheel to prevent the crawler from coming off the wheel. Accordingly, a space to dispose the tensioner wheel raises the position of the drive wheel.

In the crawler type traveling body 10 as illustrated in FIG. 8B, the drive wheel 13 itself functions as the tensioner because the tensioner 25 is coupled to the rotation shaft (that is the motor shaft 141) of the drive wheel 13. The above-described configuration enables removing the space to dispose the tensioner wheel and positioning the drive wheel 13 of the crawler type traveling body 10 lower than the drive wheel of the triangular crawler type traveling body according to the comparative embodiment, thus improving the traveling stability.

Next, with reference to FIGS. 9 to 13, the following describes a configuration including the idler wheels 18a and 18b in the crawler type traveling body 10 in detail. FIG. 9 is a perspective view of idler wheels and a link according to the present embodiment. As illustrated in FIG. 9, the crawler type traveling body 10 includes two idler wheels 18a and 18b coupled by the link 19. The link 19 is a support that supports the plurality of idler wheels 18a and 18b. In the link 19, two link plates 19a and 19b couple the idler wheels 18a and 18b. The two link plates 19a and 19b are coupled by a link shaft 191. In the link 19, a double-sided structure including the two link plates 19a and 19b support the idler wheels 18a and 18b. As illustrated in FIG. 3, the side plates 20a and 20b support the idler wheels 18a and 18b using two link plates 19a and 19b and the link shaft 191. The number of idler wheels 18a and 18b is not limited to this, and may be one, or three or more idler wheels may be supported by the link 19.

With reference to FIGS. 10A to 10C, the configuration of the idler wheel according to the present embodiment is described below. Since the configurations of the idler wheels 18a and the 18b illustrated in FIG. 9 are the same, the configuration of the idler wheel 18a is described with reference to FIGS. 10A to 10C. FIG. 10A is a perspective view of the idler wheel 18a. FIG. 10B is a front view of the idler wheel 18a viewed in the traveling direction that is a direction indicated by arrow P in FIG. 10A. As illustrated in FIGS. 10A and 10B, the idler wheel 18a is configured by wheels 182a and 184a coupled by the idler wheel shaft 181a.

FIG. 10C is a side view of the idler wheel 18a heading in the traveling direction viewed in a direction indicated by arrow Q in FIG. 10A. As illustrated in FIG. 10C, the wheel 182a of the idler wheel 18a has a plurality of wheel holes 183a. In the crawler type traveling body, foreign matter such as mud, earth, sand, or dust enters between the crawler and the idler wheel and may lock rotation of the idler wheel or cause the crawler to come off the idler wheel. The wheel holes 183a of the wheel 182a in the idler wheel 18a is a structure to smoothly eject the foreign matter. The number or shape of the wheel holes 183a is not limited to the present embodiment illustrated in FIG. 10C. The wheel 184a has the same structure as the wheel 182a.

With reference to FIGS. 11 to 13, the following describes a feature of the crawler type traveling body 10 including the idler wheels 18a and 18b. FIG. 11 is a schematic view illustrating a structure preventing the crawler from coming off the idler wheel of the crawler type traveling body according to the present embodiment. In the crawler type traveling body 10, the rotation of the drive wheel 13 incorporating the in-wheel motor 14 drives the crawler 11. The rotational force of the crawler 11 is transmitted to the rotating wheels 15a and 15b to rotate the rotating wheels 15a and 15b. The movement of the crawler 11 rotates the rotating wheels 15a and 15b. Projections 111b are disposed on the inner surface of the crawler 11 and function as guides to guide the rotating wheels 15a and 15b. In a crawler type traveling body having a long distance between the rotating wheels 15a and 15b, the crawler 11 may come off the rotating wheel 15a or 15b during traveling. FIG. 12 is a side view of a comparative crawler type traveling body including no idler wheel.

In the crawler type traveling body 10, the idler wheels 18a and 18b contact the crawler 11 between the rotating wheels 15a and 15b to prevent the crawler 11 from coming off at least one of the wheels. Disposing the idler wheels 18a and 18b in addition to the rotating wheels 15a and 15b on a ground contacting part of the crawler type traveling body 10 can distribute load and reduce a risk such as occurrence of failure.

With reference to FIG. 13, the following describes a contact position between the crawler 11 and each of the rotating wheels 15a and 15b and contact position between the crawler 11 and each of the idler wheels 18a and 18b. The left drawing in FIG. 13 is a schematic view illustrating the crawler type traveling body 10 in which the height of the contact position between the crawler 11 and each of the idler wheels 18a and 18b is the same as the height of the contact position between the crawler 11 and each of the rotating wheels 15a and 15b. The right drawing in FIG. 13 is a schematic view illustrating the crawler type traveling body 10 in which the contact position between the crawler 11 and each of the idler wheels 18a and 18b is lower than the contact position between the crawler 11 and each of the rotating wheels 15a and 15b after the idler wheels 18a and 18b are lowered. As illustrated in FIG. 13, adjusting the height of the contact position between the crawler 11 and each of the idler wheels 18a and 18b enables adjusting a ground contact area of the crawler 11 in the crawler type traveling body 10.

As illustrated in the left drawing in FIG. 13, the ground contact area of the crawler 11 is between the rotating wheels 15a and 15b when the height of the contact position between the crawler 11 and each of the idler wheels 18a and 18b is the same as the height of the contact position between the crawler 11 and each of the rotating wheels 15a and 15b. Accordingly, the crawler type traveling body 10 can increase the ground contact area and a road surface resistance, thus improving traveling stability.

As illustrated in the right drawing in FIG. 13, the ground contact area of the crawler 11 is between the idler wheels 18a and 18b when the contact position between the crawler 11 and each of the idler wheels 18a and 18b is lower than the contact position between the crawler 11 and each of the rotating wheels 15a and 15b. Accordingly, the ground contact area in the right drawing is smaller than the ground contact area in the left drawing in FIG. 13, and the road surface resistance decreases. On the other hand, since the crawler type traveling body can improve turning performance during traveling, reducing the ground contact area is particularly effective when the traveling apparatus 1 performs the ultra-pivotal turn.

In order to utilize the above-described characteristics, adjusting the height of the link 19 in the crawler type traveling body 10 enables vertically adjusting the height of the contact position between the crawler 11 and each of the idler wheels 18a and 18b according to the use application or the use environment. Specifically, one example of adjusting the height of the contact position between the crawler 11 and each of the idler wheels 18a and 18b is that an operator stops the traveling apparatus 1 and adjusts the height of the link 19 fixed in the crawler type traveling body 10. The crawler type traveling body 10 may be configured to dynamically change the height of the link 19 according to control signals from the attitude control motor driver 550, for example. In this case, the traveling apparatus 1 drives the attitude control motors 555a and 555b based on the control signals transmitted from the attitude control motor driver 550, thereby adjusting the heights of the links 19 of the two crawler type traveling bodies 10a and 10b. For example, the traveling apparatus 1 controls the height adjustment of the link 19 in accordance with the state of the road surface, the traveling speed, or the like.

Next, with reference to FIGS. 14A to 17B, the following describes a configuration of the side plates 20a and 20b in the crawler type traveling body 10 in detail. FIGS. 14A and 14b are drawings illustrating one example of the configuration of the side plates in the crawler type traveling body according to the present embodiment. FIG. 14A is a perspective view of the crawler type traveling body 10 from which the crawler 11 is removed, for illustrating the configuration of the side plates 20a and 20b. FIG. 14B is a side view of the crawler type traveling body 10 from which the crawler 11 is removed, as viewed from a direction indicated by arrow P in FIG. 14A, for illustrating the configuration of the side plates 20a and 20b. The two side plates 20a and 20b couple the drive wheel 13, the rotating wheels 15a and 15b, and the link 19 coupling the idler wheels 18a and 18b. A plurality of side plate supports 27a, 27b, 27c, and 27d couple the two side plates 20a and 20b. The double-sided structure configured by the two side plates 20a and 20b supports the drive wheel 13, the rotating wheels 15a and 15b, and the link 19 coupling the idler wheels 18a and 18b. The number of side plate supports is not limited to two.

As described above, in the crawler type traveling body 10, the double-sided structure configured by the two side plates 20a and 20b supports the wheel shafts that are the motor shaft 141 of the drive wheel 13 and the rotating wheel shafts 151a and 151b of the rotating wheels 15a and 15b. The in-wheel motor 14 built in the drive wheel 13 is large and heavy. In addition, the tensioner 25 is coupled to the motor shaft 141 of the in-wheel motor 14. Therefore, a cantilever structure to support the drive wheel and the rotating wheel requires another large support such as an arm structure. The double-sided structure configured by the side plates 20a and 20b to support the drive wheel 13 and the rotating wheels 15a and 15b in the crawler type traveling body 10 is a compact structure and can stably apply tension to the crawler 11. In the crawler type traveling body 10, the side plates 20a and 20b support both ends of all shafts of all the wheels including the idler wheels 18a and 18b, which can provide a simple and robust layout and structure.

Next, with reference to FIGS. 15 to 17B, the following describes features of the side plates 20a and 20b in the crawler type traveling body 10. Since the side plates 20a and 20b illustrated in FIGS. 14A and 14B have the same structure, FIGS. 15 to 17B illustrate the side plate 20a to describe the features of the side plates 20a and 20b. As illustrated in FIG. 15, the side plate 20a has cutout portions 201a and 203a each formed by cutting out a region facing the ground contact surface of the crawler 11 that is a bottom surface of the crawler 11. The crawler type traveling body 10 has the double-sided structure configured by the two side plates 20a and 20b as described above. The double-sided structure is likely to catch foreign matter such as a branch of a tree or a stone between the wheel and the side plate, and the wheel may be locked. In the crawler type traveling body 10 according to the present embodiment, the cutout portions 201a and 203a are formed in the side plate 20a so that the idler wheels 18a and 18b are not covered with the side plate 20a. Forming the cutout portions 201a and 203a can prevent foreign matter from entering between the side plate 20a and each of the idler wheels 18a and 18b. The shape and the number of the cutout portions 201a and 203a are not limited to the above, and for example, the cutout portions may be formed so that the side plate 20a does not cover a part of the rotating wheels 15a and 15b.

In addition, as illustrated in FIG. 16, the side plate 20a has a plurality of side plate holes 205a so that foreign matter entering between each wheel and the side plate 20a is smoothly discharged. Thus, the crawler type traveling body 10 can prevent trouble caused by the foreign matter entering between each wheel and the side plate 20a. Forming the side plate holes 205a in the side plate 20a can reduce the weight of the crawler type traveling body 10 and allow the user to visually check the state of the inside of the crawler type traveling body 10. Forming the side plate holes 205a in the side plate 20a enables, for example, passing various types of wiring in the traveling apparatus 1 through the side plate holes 205a. The number or shape of the side plate holes 205a is not limited to the embodiment illustrated in FIG. 16.

FIG. 17A is a schematic front view of the side plate 20a removed from the crawler type traveling body 10. The side plate 20a has rotating wheel shaft coupling areas 210a and 210b to which the wheel shafts (i.e. the rotating wheel shafts) of the rotating wheels 15a and 15b are coupled, respectively. The side plate 20a includes shaft holders 230a and 230b disposed on the rotating wheel shaft coupling areas 210a and 210b, respectively. FIG. 17B illustrates an example of the shape of the shaft holder 230 that represents one of the shaft holders 230a and 230b. As illustrated in FIG. 17B, the shaft holder 230 is a member to hold the wheel shaft (that is, the rotating wheel shaft) of each of the rotating wheels 15a and 15b. The upper portion of the shaft holder 230 pushes and holds the wheel shaft (that is the rotating wheel shaft). The above-described structure in the crawler type traveling body 10 can limit ranges in which the wheel shafts (i.e., rotating wheel shafts) of the rotating wheels 15a and 15b vertically move in the rotating wheel shaft coupling areas 210a and 210b. Thus, the tension of the crawler 11 can be adjusted, and the attachment and detachment of the crawler 11 can be facilitated.

The side plate 20a as illustrated in FIG. 17A has a plurality of attachment coupling holes 260a arranged along each of the wheel shafts of the rotating wheels 15a and 15b. The attachment coupling holes 260a are coupling holes to couple the side plate 20a and an attachment such as a coming-off stopper 310 to prevent the crawler 11 from coming off the wheel. FIG. 18 is a side view of the crawler type traveling body 10 including the side plate 20a to which coming-off stoppers 310a and 310b are attached. The coming-off stoppers 310a and 310b may be representatively referred to as the coming-off stopper 310 as described above and one example of attachments. In the crawler type traveling body 10, the coming-off stoppers 310a and 310b coupled to the side plate 20a serve as stoppers to prevent the crawler 11 from coming off the wheels. The shape of the coming-off stopper 310 and a method to couple the attachment to the side plate 20a are not limited to the embodiment illustrated in FIG. 18.

As illustrated in FIG. 17A, the side plate 20a has a plurality of screw hole regions 280a. The screw hole regions 280a are used for coupling the side plate 20a to the main body 50, for example. The plurality of screw hole regions 280a includes regions in which screw holes are arranged vertically and regions in which screw holes are arranged horizontally, and the regions are arranged so as to be bilaterally symmetrical in the side plate 20a. The side plate 20a and the main body 50 are coupled using any screw hole(s) in the plurality of screw hole regions 280a formed in the side plate 20a.

With reference to FIG. 19, the following describes a configuration of the main body 50 to be coupled to the crawler type traveling body 10 via the side plate 20a. FIG. 19 is a side view illustrating a side surface of the main body 50 to fix the crawler type traveling body 10 after one of the crawler type traveling bodies 10 is removed from the traveling apparatus 1. As illustrated in FIG. 19, connectors 580a and 580b are attached to the main body 50 to couple the crawler type traveling body 10 to the side surfaces of the main body 50. The connector 580a has a plurality of screw hole regions 585a, and the connector 580b has a plurality of screw hole regions 585b. The plurality of screw hole regions 585a and 585b are used to couple the main body 50 to the crawler type traveling body 10. Similar to the plurality of screw hole regions 280a in the side plate 20a, each of the plurality of screw hole regions 585a and 585b includes a region in which screw holes are vertically arranged and a region in which screw holes are horizontally arranged. The main body 50 and the crawler type traveling body 10 are coupled using any screw holes in the plurality of screw hole regions 280a formed in the side plate 20a and any screw holes in the plurality of screw hole regions 585a and 585b formed in the connectors 580a and 580b.

Fixing the side plate 20a on the side surface of the main body 50 using the plurality of screw holes in the connectors 580a and 580b attached to the main body 50 and the plurality of screw holes formed in the side plate 20a improves robustness regarding the coupling between the crawler type traveling body 10 and the main body 50 compared with fixing the side plate 20a on the side surface of the main body 50 using one screw hole in each of the connectors 580a and 580b and two screw holes in the side plate 20a.

In the traveling apparatus 1, suitably selecting the screw holes to couple the connectors 580a and 580b in the main body 50 to the side plate 20a from the plurality of screw holes in the screw hole region 280a of the side plate 20a enables changing the clearance between the main body 50 and the ground contact surface of the crawler type traveling body 10.

The shape of the connectors 580a and 580b is not limited to the embodiment illustrated in FIG. 19. Without using the connectors 580a and 580b, the main body 50 may be coupled to the crawler type traveling body 10 using screw holes formed in the main body 50.

As illustrated in FIGS. 15 to 17B, the plurality of side plate holes 205a and the plurality of screw holes in the side plate 20a are symmetrically disposed with respect to the vertical center line of the side plate 20a. The above-described configuration of the side plate 20a can keep driving characteristics of the crawler type traveling body 10 in the traveling direction unchanged. The side plate 20a having the bilaterally symmetrical plurality of screw hole regions 280a can be attached to any one of both sides of the crawler type traveling body 10.

Next, with reference to FIGS. 20A to 21C, the following describes a configuration of the drive wheel 13 and the rotating wheels 15 in the crawler type traveling body 10 in detail. Firstly, the configuration of the drive wheel 13 is described with reference to FIGS. 20A to 20C. FIG. 20A is a perspective view of the drive wheel 13, and FIG. 20B is a front view of the drive wheel 13 viewed from a direction indicated by arrow P in FIG. 20A that is the traveling direction in the drive wheel 13.

The drive wheel 13 includes a sprocket 131 to transmit rotations of the in-wheel motor 14 to the crawler 11. The in-wheel motor 14 is fixed inside the drive wheel 13. The sprocket 131 in the drive wheel 13 rotates with the rotations of the in-wheel motor 14 about the motor shaft 141 as the rotation shaft (that is, the drive shaft). The sprocket 131 includes wheels 132 and 134 coupled by couplers 136. The couplers 136 are disposed between the wheels 132 and 134 at equal intervals around the outer circumference of the wheels 132 and 134. The projections 111b disposed on the inner surface of the crawler 11 rotate the crawler 11 while entering between the adjacent couplers 136 of the sprocket 131. The above-described configuration in the crawler type traveling body 10 enables a more reliable drive transmission between the crawler 11 and the drive wheels 13. In addition, the drive wheel 13 includes a plurality of supports 138 to support the in-wheel motor 14 on the sprocket 131. Changing the length of the support 138 can incorporate the in-wheel motor 14 having a different width in the drive wheel 13.

Additionally, the motor shaft 141 of the in-wheel motor 14 in the drive wheel 13 is a cylinder, and a main body cable 143 passes through the motor shaft 141 to couple the in-wheel motor 14 to the main body 50. The in-wheel motor 14 in the drive wheel 13 receives power from a battery 530 in the main body 50 via the main body cable 143.

FIG. 20C is a side view of the drive wheel 13 heading in the traveling direction viewed in a direction indicated by arrow Q in FIG. 20A. Similar to the idler wheel 18a, the wheel 132 of the drive wheel 13 has a plurality of wheel holes 133 to prevent foreign matter from entering between the crawler 11 and the drive wheel 13 and inside the sprocket 131. The above-described structure in the drive wheel 13 smoothly discharges the foreign matter entering between the drive wheel 13 and the crawler 11 and inside the sprocket 131. Note that the number or shape of the wheel holes 133 is not limited to the embodiment illustrated in FIG. 20C. The wheel 134 has the same structure as the wheel 132.

Next, the configuration of the rotating wheels 15a and 15b is described with reference to FIGS. 21A to 21C. Since the configurations of the rotating wheels 15a and 15b are the same, the configuration of the rotating wheel 15a is described with reference to FIGS. 21A to 21C. FIG. 21A is a perspective view of the rotating wheel 15a. FIG. 21B is a front view of the rotating wheel 15a, viewed from a direction indicated by arrow Pin FIG. 21A that is the traveling direction in the rotating wheel 15a.

The rotating wheel 15a includes wheels 152a and 154a coupled by the rotating wheel shaft 151a. The rotating wheel 15a includes couplers 156a disposed between the wheels 152a and 154a at equal intervals around the outer circumferences of the wheels 152a and 154a.

FIG. 21C is a side view of the rotating wheel 15a heading in the traveling direction viewed in a direction indicated by arrow Q in FIG. 21A. Similar to the idler wheel 18a, the wheel 152a of the rotating wheel 15a has a plurality of wheel holes 153a to prevent foreign matter from entering between the crawler 11 and the rotating wheel 15a and inside the rotating wheel 15a. The above-described structure in the rotating wheel 15a smoothly discharges the foreign matter entering between the rotating wheel 15a and the crawler 11 and inside the rotating wheel 15a. The number or shape of the wheel holes 153a is not limited to the present embodiment illustrated in FIG. 21C. The wheel 154a has the same structure as the wheel 152a.

The diameter of each of the wheel holes in the idler wheels 18a and 18b, the drive wheel 13, and the rotating wheels 15a and 15b is preferably 15 mm or more to smoothly discharge the various kinds of foreign matter. The same applies to the side plate holes 205a and 205b in the side plates 20a and 20b.

Next, with reference to FIGS. 22 to 23B, the following describes a feature of the traveling apparatus 1 including the crawler type traveling body 10. As illustrated in FIGS. 1A to 1C, the traveling apparatus 1 includes the two crawler type traveling bodies 10a and 10b supported on the left and right sides of the main body 50 to be able to travel the traveling apparatus 1. FIGS. 22 to 23B illustrate the feature that is a positional relationship between the battery 530 in the main body 50 and the in-wheel motor 14 that is a heavy object among components constituting the traveling apparatus 1 to improve the traveling stability of the traveling apparatus 1.

As illustrated in FIG. 22, in the traveling apparatus 1, the battery 530 inside the main body 50 is disposed at a position lower than the motor shaft 141 of the in-wheel motor 14. Specifically, in the traveling apparatus 1, the battery 530 is disposed inside the main body 50 such that the gravitational center of the battery 530 is positioned lower than the shaft center of the motor shaft 141 of the in-wheel motor 14. That is, in the traveling apparatus 1, the position of the gravitational center of the battery 530 is lower than the motor shaft 141 of the in-wheel motor 14. Since the drive wheel 13 incorporating the in-wheel motor 14 is heavier than any one of other wheels such as the rotating wheels 15a and 15b and the side plates 20a and 20b, the gravitational center of the above-described triangular crawler type traveling body 10 is higher than that of the comparative crawler type traveling body that does not include the drive wheel incorporating the in-wheel motor. Setting the gravitational center of the battery 530, which is a heavy component in the traveling apparatus 1, to be lower than the shaft center of the in-wheel motor 14 improves the stability of the traveling apparatus 1 including the main body 50.

FIG. 23A is a side view of the traveling apparatus 1 viewed in the X-axis direction. As illustrated in FIG. 23A, the shaft center of the motor shaft 141 of the in-wheel motor 14 is above an installation area 530a of the battery 530 in the side view of the traveling apparatus 1, that is, positioned so as to overlay an area over the installation area 530a of the battery 530 in the side view of the traveling apparatus 1. Preferably, in the side view of the traveling apparatus 1 viewed in the X-axis direction, the position of the gravitational center of the battery 530 in the side view that is the Y-Z plane in FIG. 23A is substantially on a vertical line 14L passing through the shaft center of the motor shaft 141 of the in-wheel motor 14 in the side view that is the Y-Z plane in FIG. 23A. The above-described layout of the traveling apparatus 1 in which the position of the gravitational center of the battery 530 in the side view that is the Y-Z plane in FIG. 23A is substantially on the vertical line 14L passing through the shaft center of the in-wheel motor 14 can utilize the feature of the crawler type traveling body 10 having a symmetrical structure in the traveling direction. FIG. 23B is a front view of the traveling apparatus 1 viewed in the Y-axis direction. In FIG. 23B, the traveling apparatus 1 is substantially symmetrical with respect to a vertical line M (that is, a line in the Z-axis direction) passing through the gravitational center of the traveling apparatus 1. The battery 530 is disposed so as to be substantially symmetrical with respect to a vertical line (that is, a line in the Z-axis direction) passing through a center of the main body 50 in a front view of the main body 50 viewed in the Y direction.

The following describes examples of applications of the traveling apparatus 1. The traveling apparatus 1 including the crawler type traveling body 10 described above may be used in various situations by attaching a device or member having a function according to a use application to the main body 50. For example, taking advantage of high turning performance, the traveling apparatus 1 may be used as a work robot performing light work such as transportation of an article in a narrow passage of a base such as a factory or a warehouse. The above-described working robot includes, for example, a carrier for transportation or a movable arm for light work attached to the traveling apparatus 1.

Alternatively, the traveling apparatus 1 may be used for rescue applications in disaster sites or recovery assistance from damages, agricultural applications, construction applications, or the like. In such applications, using the improved traveling stability of the crawler type traveling body 10, the traveling apparatus 1 can reduce the risk of occurrence of malfunctions during traveling on a rough road in which rubble or dust is scattered.

Alternatively, the traveling apparatus 1 may include a camera and a display and be used as a telepresence robot to perform bidirectional remote communication between a user in a remote place and a user in a base in which the traveling apparatus 1 exists. Using the telepresence robot enables, in a remote site, performing management works, maintenance works, or the like for devices in a base, or confirmation of positions or flow lines of persons in the base. The traveling apparatus 1 may be configured to travel in response to a remote operation from the user at a remote place.

As described above, a crawler type traveling body according to the embodiment of the present disclosure is the crawler type traveling body 10 that includes the drive wheel 13, the in-wheel motor 14 incorporated in the drive wheel 13, the at least two rotating wheels 15a and 15b disposed below the drive wheel 13, the crawler 11 wound around the drive wheel 13 and the rotating wheels 15a and 15b and configured to be rotated by the drive wheel 13, and the tensioner 25 coupled to the motor shaft 141, which is an example of a drive shaft of the in-wheel motor 14, and configured to press the drive wheel 13 against the crawler 11 and apply tension to the crawler 11. The above-described structure lowers the gravitational center of the crawler type traveling body 10 and can improve traveling stability.

Additionally, the crawler type traveling body according to the embodiment of the present disclosure is symmetrical with respect to a vertical line passing through the motor shaft 141, which is the example of the drive shaft of the in-wheel motor 14, in the side view of the crawler type traveling body. In the above-described crawler type traveling body 10, the symmetrical structure in the traveling direction can improve stability during traveling and simplify control during traveling.

In addition, the crawler type traveling body according to the embodiment of the present disclosure includes an auxiliary wheel such as the idler wheel 18a or 18b disposed between the two rotating wheels 15a and 15b. The auxiliary wheel such as the idler wheel 18a or 18b is configured to be driven and rotated by the crawler 11. Additionally, in the crawler type traveling body 10, the contact position between the crawler 11 and each of the idler wheel 18a and 18b is lower than the contact position between the crawler 11 and each of the rotating wheels 15a and 15b. The above-described structure of the crawler type traveling body 10 can improve turning performance during traveling.

In addition, the crawler type traveling body according to the embodiment of the present disclosure includes the side plates 20a and 20b that constitute the double-sided structure to support the drive wheel 13 and the rotating wheels 15a and 15b. Alternatively, instead of the side plates 20a and 20b, one U-shaped side plate may be used in which one side functions as the side plate 20a and the other side functions as the side plate 20b. The above-described crawler type traveling body 10 can stably apply tension to the crawler 11 with a compact structure. Additionally, in the crawler type traveling body 10, the side plate 20a or 20b has a cutout portion such as the cutout portion 201a or 203a formed by cutting out a region facing the ground contact surface in which the crawler 11 contacts ground. The above-described crawler type traveling body 10 can prevent foreign matter from entering between the side plate 20a and each wheel and between the side plate 20b and each wheel.

In addition, the traveling apparatus 1 according to the embodiment of the present disclosure includes the crawler type traveling body 10 and the main body 50 that supports at least two crawler type traveling bodies 10a and 10b in a traveling state. In the traveling apparatus 1, the main body 50 includes the battery 530 to supply power to the in-wheel motor 14, and the position of the gravitational center of the battery 530 is lower than the motor shaft 141 that is the example of the drive shaft of the in-wheel motor 14. The above-described structure of the traveling apparatus 1 improves the stability of the traveling apparatus 1 including the main body 50. Additionally, in the traveling apparatus 1, the motor shaft 141 of the in-wheel motor 14 is above the installation area of the battery 530 in the side view of the traveling apparatus 1. The above-described traveling apparatus 1 can utilize the feature of the crawler type traveling body 10 having a symmetrical structure in the traveling direction.

In the above, a description is given of the crawler type traveling body and the traveling apparatus according to the present embodiment of the present disclosure. Embodiments of the present disclosure are not limited to the present embodiment described above and can be changed within the range that can be conceived of by those skilled in the art, such as other embodiments, additions, modifications, deletions, and the scope of the present disclosure encompasses any aspect, as long as the aspect achieves the operation and advantageous effect of the present disclosure.

The above-described embodiments are illustrative and do not limit the present disclosure. Thus, numerous additional modifications and variations are possible in light of the above teachings. It is therefore to be understood that within the scope of the present disclosure, the present disclosure may be practiced otherwise than as specifically described herein. Further, features of components of the embodiments, such as the number, the position, and the shape are not limited the embodiments and thus may be preferably set.

What is claimed is:

1. A crawler type traveling body comprising:
   a drive wheel including an in-wheel motor;
   a plurality of rotating wheels disposed below the drive wheel;
   a crawler wound around the drive wheel and the rotating wheels and configured to be rotated by the drive wheel; and
   a tensioner coupled directly to a drive shaft of the in-wheel motor, the tensioner configured to fix the drive shaft of the in-wheel motor.

2. The crawler type traveling body according claim 1, wherein the tensioner includes an elastic body, and wherein the elastic body is configured to deform and press the drive shaft to press the drive wheel against the crawler.

3. The crawler type traveling body according to claim 1, wherein the crawler type traveling body is symmetrical with respect to a vertical line passing through the drive shaft of the in-wheel motor in a side view of the crawler type traveling body.

4. The crawler type traveling body according to claim 1, further comprising an auxiliary wheel disposed between the rotating wheels and configured to be driven and rotated by the crawler.

5. The crawler type traveling body according to claim 4, wherein a contact position between the auxiliary wheel and the crawler is lower than a contact position between the crawler and each of the rotating wheels.

6. The crawler type traveling body according to claim 1, further comprising:
a side plate having a double-sided structure to support the drive wheel and the rotating wheels.

7. The crawler type traveling body according to claim 6, wherein the side plate has a cutout portion in which a region facing a ground contact surface of the crawler that contacts ground is cut out.

8. The crawler type traveling body according to claim 1, wherein at least one wheel of the rotating wheels has at least one wheel hole.

9. A traveling apparatus comprising:
a plurality of crawler type traveling bodies, each of which is the crawler type traveling body according to claim 1; and
a main body supporting the plurality of crawler type traveling bodies.

10. A traveling apparatus comprising:
a plurality of crawler type traveling bodies, each of which is the crawler type traveling body according to claim 1; and
a main body supporting the plurality of crawler type traveling bodies,
wherein the main body includes a battery configured to supply power to the in-wheel motor, and
wherein a position of a gravitational center of the battery is lower than the drive shaft of the in-wheel motor.

11. The traveling apparatus according to claim 10, wherein the drive shaft of the in-wheel motor is above an installation area of the battery in a side view of the traveling apparatus.

12. The crawler type traveling body according to claim 1, wherein the tensioner is configured to stop a rotation of the drive shaft of the in-wheel motor.

13. The crawler type traveling body according to claim 1, wherein the in-wheel motor does not include a drive chain or a gear.

14. The crawler type traveling body according to claim 1, wherein the drive wheel is configured not to contact a road surface.

15. The crawler type traveling body according to claim 1, wherein a diameter of the drive wheel is different from a diameter of each of the rotating wheels.

16. The crawler type traveling body according to claim 1, wherein a diameter of the drive wheel is larger than a diameter of each of the rotating wheels.

17. The crawler type traveling body according to claim 1, wherein the tensioner includes a fastener configured to fix a motor shaft to a block to stop a rotation of the motor shaft.

* * * * *